US012803748B2

(12) United States Patent
Pham et al.

(10) Patent No.: US 12,803,748 B2
(45) Date of Patent: Nov. 17, 2026

(54) AUTOMATED CONFIGURATION OF REFERENCE SIGNAL RESOURCES RELATING TO CHANNEL STATE

(71) Applicant: Dell Products L.P., Round Rock, TX (US)

(72) Inventors: Thang Pham, Dollard-des-Ormeaux (CA); Ravi Sharma, Cupertino, CA (US)

(73) Assignee: Dell Products L.P., Round Rock, TX (US)

( * ) Notice: Subject to any disclaimer, the term of this patent is extended or adjusted under 35 U.S.C. 154(b) by 288 days.

(21) Appl. No.: 18/620,566

(22) Filed: Mar. 28, 2024

(65) Prior Publication Data

US 2025/0310059 A1 Oct. 2, 2025

(51) Int. Cl.
*H04L 5/00* (2006.01)

(52) U.S. Cl.
CPC .................................. *H04L 5/0051* (2013.01)

(58) Field of Classification Search
CPC ....... H04L 5/0051; H04L 5/0048; H04B 7/04; H04B 7/0413; H04B 7/06; H04B 7/0626
See application file for complete search history.

(56) References Cited

U.S. PATENT DOCUMENTS

2011/0170435 A1* 7/2011 Kim ...................... H04L 1/0003
370/252
2018/0254864 A1* 9/2018 Bontu ................... H04L 5/0035
2018/0279152 A1* 9/2018 Kim ......................... H04B 7/00
2019/0281487 A1* 9/2019 Liu ....................... H04L 1/0026
2025/0392360 A1* 12/2025 Dai ...................... H04B 7/0626

OTHER PUBLICATIONS

"5G; NR; Physical channels and modulation (3GPP TS 38.211 version 16.6.0 Release 16)" ETSI TS 138 211 V16.6.0, Aug. 2021, 138 pages.
"5G SON—Automatic Neighbor Relations—ANR" Techplayon. Dec. 3, 2024. [https://www.techplayon.com/automatic-neighbour-relation-anr-5g/] retrieved Feb. 23, 2026, 8 pages.

* cited by examiner

*Primary Examiner* — Mohamed A Kamara
(74) *Attorney, Agent, or Firm* — Amin, Turocy & Watson, LLP

(57) ABSTRACT

Automated allocation and configuration of reference signal resources relating to channel state information on a radio access network (RAN) can be performed. An allocator can allocate respective reference signal profiles associated with respective profile index values to respective cells of RAN based on respective profile index values associated with a profile type determined, from a group of profile types, based on cell relation topology information, wherein allocation can be performed to result in respective zero power reference signal (ZP-RS) resources, associated with respective reference signal profiles allocated to respective adjacent cells, being orthogonal with respect to each other. In each reference signal profile, ZP-RS resource can be orthogonal to non-zero power reference signal (NZP-RS) resource. Based on respective reference signal profiles, a configurator can configure respective parameters of respective resources, comprising respective ZP-RS resources and respective NZP-RS resources, associated with respective reference signal profiles on respective cells.

20 Claims, 14 Drawing Sheets

500

| Row | Ports $X$ | Density $\rho$ | *cdm-Type* | $(\bar{k},\bar{l})$ | CDM group index $j$ | $k'$ | $l'$ |
|---|---|---|---|---|---|---|---|
| 1 | 1 | 3 | noCDM | $(k_0,l_0)$, $(k_0+4,l_0)$, $(k_0+8,l_0)$ | 0,0,0 | 0 | 0 |
| 2 | 1 | 1, 0.5 | noCDM | $(k_0,l_0)$, | 0 | 0 | 0 |
| 3 | 2 | 1, 0.5 | fd-CDM2 | $(k_0,l_0)$, | 0 | 0, 1 | 0 |
| 4 | 4 | 1 | fd-CDM2 | $(k_0,l_0)$, $(k_0+2,l_0)$ | 0,1 | 0, 1 | 0 |
| 5 | 4 | 1 | fd-CDM2 | $(k_0,l_0)$, $(k_0,l_0+1)$ | 0,1 | 0, 1 | 0 |
| 6 | 8 | 1 | fd-CDM2 | $(k_0,l_0)$, $(k_1,l_0)$, $(k_2,l_0)$, $(k_3,l_0)$ | 0,1,2,3 | 0, 1 | 0 |
| 7 | 8 | 1 | fd-CDM2 | $(k_0,l_0)$, $(k_1,l_0)$, $(k_0,l_0+1)$, $(k_1,l_0+1)$ | 0,1,2,3 | 0, 1 | 0 |
| 8 | 8 | 1 | cdm4-FD2-TD2 | $(k_0,l_0)$, $(k_1,l_0)$ | 0,1 | 0, 1 | 0, 1 |
| 9 | 12 | 1 | fd-CDM2 | $(k_0,l_0)$, $(k_1,l_0)$, $(k_2,l_0)$, $(k_3,l_0)$, $(k_4,l_0)$, $(k_5,l_0)$ | 0,1,2,3,4,5 | 0, 1 | 0 |
| 10 | 12 | 1 | cdm4-FD2-TD2 | $(k_0,l_0)$, $(k_1,l_0)$, $(k_2,l_0)$ | 0,1,2 | 0, 1 | 0, 1 |
| 11 | 16 | 1, 0.5 | fd-CDM2 | $(k_0,l_0)$, $(k_1,l_0)$, $(k_2,l_0)$, $(k_3,l_0)$, $(k_0,l_0+1)$, $(k_1,l_0+1)$, $(k_2,l_0+1)$, $(k_3,l_0+1)$ | 0,1,2,3, 4,5,6,7 | 0, 1 | 0 |
| 12 | 16 | 1, 0.5 | cdm4-FD2-TD2 | $(k_0,l_0)$, $(k_1,l_0)$, $(k_2,l_0)$, $(k_3,l_0)$ | 0,1,2,3 | 0, 1 | 0, 1 |
| 13 | 24 | 1, 0.5 | fd-CDM2 | $(k_0,l_0)$, $(k_1,l_0)$, $(k_2,l_0)$, $(k_0,l_0+1)$, $(k_1,l_0+1)$, $(k_2,l_0+1)$,$(k_0,l_1)$, $(k_1,l_1)$, $(k_2,l_1)$, $(k_0,l_1+1)$, $(k_1,l_1+1)$, $(k_2,l_1+1)$ | 0,1,2,3,4,5, 6,7,8,9,10,11 | 0, 1 | 0 |
| 14 | 24 | 1, 0.5 | cdm4-FD2-TD2 | $(k_0,l_0)$, $(k_1,l_0)$, $(k_2,l_0)$, $(k_0,l_1)$, $(k_1,l_1)$, $(k_2,l_1)$ | 0,1,2,3,4,5 | 0, 1 | 0, 1 |
| 15 | 24 | 1, 0.5 | cdm8-FD2-TD4 | $(k_0,l_0)$, $(k_1,l_0)$, $(k_2,l_0)$ | 0,1,2 | 0, 1 | 0, 1, 2, 3 |
| 16 | 32 | 1, 0.5 | fd-CDM2 | $(k_0,l_0)$, $(k_1,l_0)$, $(k_2,l_0)$, $(k_3,l_0)$,$(k_0,l_0+1)$, $(k_1,l_0+1)$, $(k_2,l_0+1)$, $(k_3,l_0+1)$, $(k_0,l_1)$, $(k_1,l_1)$, $(k_2,l_1)$, $(k_3,l_1)$, $(k_0,l_1+1)$, $(k_1,l_1+1)$, $(k_2,l_1+1)$, $(k_3,l_1+1)$ | 0,1,2,3, 4,5,6,7, 8,9,10,11, 12,13,14,15 | 0, 1 | 0 |
| 17 | 32 | 1, 0.5 | cdm4-FD2-TD2 | $(k_0,l_0)$, $(k_1,l_0)$, $(k_2,l_0)$, $(k_3,l_0)$, $(k_0,l_1)$, $(k_1,l_1)$, $(k_2,l_1)$, $(k_3,l_1)$ | 0,1,2,3,4,5,6,7 | 0, 1 | 0, 1 |
| 18 | 32 | 1, 0.5 | cdm8-FD2-TD4 | $(k_0,l_0)$, $(k_1,l_0)$, $(k_2,l_0)$, $(k_3,l_0)$ | 0,1,2,3 | 0,1 | 0,1, 2, 3 |

FIG. 5

AUTOMATED CONFIGURATION OF REFERENCE SIGNAL RESOURCES RELATING TO CHANNEL STATE

BACKGROUND

Communication networks can enable users to use devices to wirelessly connect to a communication network and communicate with other devices (e.g., wireless devices or other communication devices). A device, such as a mobile device (e.g., smart phone or other mobile wireless device) can connect (e.g., wirelessly connect) to a cell (e.g., cell of a base station) or other access point associated with a radio access network (RAN) to facilitate connection to a communication network.

The above-described description is merely intended to provide a contextual overview regarding communication systems, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise allocating, by a system comprising at least one processor, respective reference signal profiles associated with respective profile index values to respective cells associated with a radio access network based on the respective profile index values associated with a profile type that can be determined, from a group of profile types, based on cell relation topology information, wherein the allocating can be performed to result in respective zero power reference signal resources, associated with the respective reference signal profiles allocated to respective adjacent cells of the respective cells, being orthogonal with respect to each other. The method also can comprise: based on the respective reference signal profiles, setting, by the system, respective parameters of respective resources, comprising the respective zero power reference signal resources, associated with the respective reference signal profiles on the respective cells.

In certain embodiments, the disclosed subject matter can comprise a system that can comprise at least one memory that can store computer executable components, and at least one processor that can execute computer executable components stored in the at least one memory. The computer executable components can comprise an allocator that can allocate respective reference signal profiles associated with respective profile index values to respective cells associated with a network based on respective profile index values associated with a profile type that can be determined, from a group of profile types, based on cell relation topology data, wherein the allocator can determine the respective reference signal profiles to allocate to respective adjacent cells of the respective cells to ensure that respective zero power reference signal resources, associated with the respective reference signal profiles allocated to the respective adjacent cells, can be orthogonal with respect to each other. The computer executable components also can comprise a configurator that can configure respective parameters of respective resources, comprising the respective zero power reference signal resources, associated with the respective reference signal profiles on the respective cells, based on respective reference signal profile data of the respective reference signal profiles.

In still other embodiments, the disclosed subject matter can comprise a non-transitory machine-readable medium, comprising executable instructions that, when executed by at least one processor, can facilitate performance of operations. The operations can comprise assigning respective reference signal profiles associated with respective profile index values to respective cell devices associated with a radio access network based on the respective profile index values associated with a profile type that can be determined, from a group of profile types, based on cell relation topology information that can indicate respective locational relationships between respective cell coverage areas of the respective cell devices, wherein the assigning can be performed to have respective zero power reference signal resources, associated with the respective reference signal profiles assigned to respective neighboring cell devices of the respective cell devices, be orthogonal with respect to each other. The operations also can comprise: based on the respective reference signal profiles, configuring respective parameters of respective resources, comprising the respective zero power reference signal resources, associated with the respective reference signal profiles on the respective cell devices.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

BRIEF DESCRIPTION OF THE DRAWINGS

FIG. 5 presents a diagram of a non-limiting example reference signal locations table that can comprise information relating to reference signal locations (e.g., CSI-RS locations) within a slot, in accordance with various aspects and embodiments of the disclosed subject matter.

DETAILED DESCRIPTION

Figure 1:
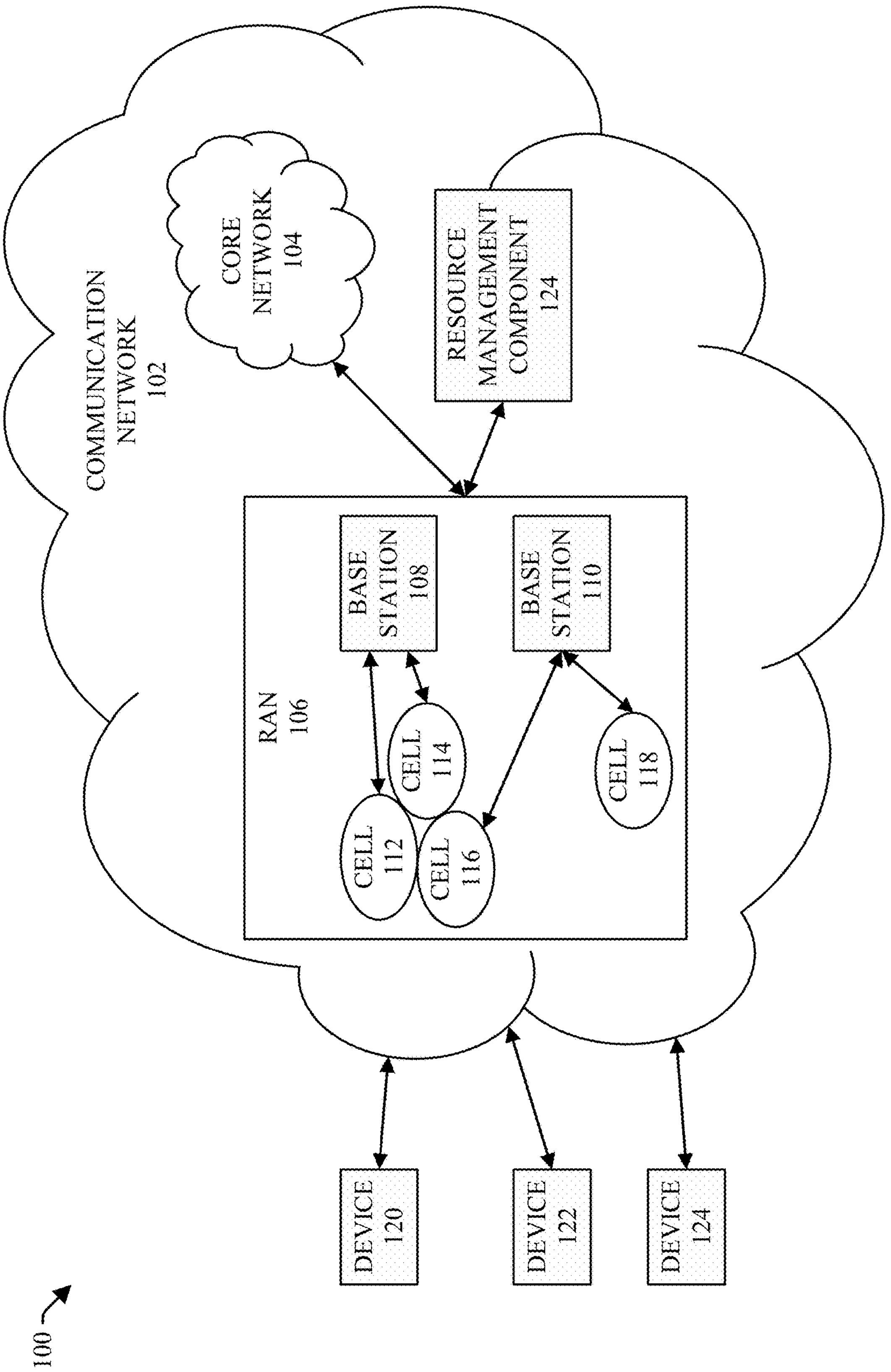
FIG. 1 illustrates a block diagram of a non-limiting example system that can desirably manage and perform allocation and/or configuration of reference signal resources relating to channel state information (CSI) and/or other resources on one or more radio access networks (RANs) of a communication network, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

This disclosure relates generally to automated allocation and/or configuration of resources, including reference signal resources relating to channel state information (CSI), on a radio access network (RAN) of a communication network (e.g., communication network comprising a core network that can facilitate wireless communication of information between devices, including wireless devices). A device, such as a mobile device (e.g., user equipment (UE), smart phone, or other mobile wireless device) can connect (e.g., wirelessly connect) to a cell (e.g., cell of a base station) or other access point associated with the RAN of the communication network to facilitate connection to the communication network.

In the RAN, the configuration of resources, such as reference signal resources (e.g., CSI-reference signal (CSI-RS) resources), can be desirable (e.g., wanted, important, or critical) to enable and/or ensure efficient and reliable air or wireless communication of information between the device and the RAN. There can be different CSI-RS allocations schemes, with different characteristics to select from, which can result in different trade-off impact, depending on the deployment scenario.

Some existing techniques for allocating and configuring resources, such as CSI-RS resources, on a RAN can be undesirably (e.g., inefficiently, unsuitably, or suboptimally) complex, as such existing techniques may not be standardized and can involve an end user (e.g., a service management and orchestration (SMO) operator or other type of end user) having to have in-depth training on how Third Generation Partnership Project (3GPP) standards (e.g., technical specifications) would work in order to understand the RAN interface, including the capability limitations of the RAN. The end user also has to understand in-depth the applicable standards in order to select a desirable (e.g., suitable, proper, or optimal) CSI-RS resource allocation and configuration scheme, and a desirable selection of resources, to achieve maximal (e.g., optimum) radio performance (e.g., throughput, latency, or battery usage of the device) while minimizing overhead and resource usage. Further, existing techniques where the user is selecting the CSI-RS resource allocation and configuration scheme, and selecting resources, for the RAN can be undesirably error prone (e.g., can be subject to human error).

It can be desirable (e.g., wanted, useful, or advantageous) to shield the end user (e.g., SMO operator) from the complexities of reference signal resource configuration while providing a desirable (e.g., suitable, proper, efficient, reliable, or optimum) configuration. However, shielding the end user from the complexities of reference signal resource configuration while providing a desirable configuration can present a significant challenge.

The disclosed subject matter can address and overcome these and other deficiencies and challenges of these existing techniques with regard to allocation and/or configuration of reference signal resources relating to CSI (CSI-RS resources) and/or other resources on RANs of a communication network. In that regard, it can be desirable (e.g., wanted, advantageous, beneficial, or optimal) to shield the end user from the complexities of reference signal resource configuration while providing desirable configuration of reference signal resources on RANs. It also can be desirable to automate allocation and/or configuration of reference signal resources and/or other resources on RANs.

The disclosed subject matter can employ enhanced design, allocation, and configuration techniques that can desirably (e.g., suitably, enhancedly, or optimally) reduce complexity of reference signal configuration (e.g., RAN CSI-RS configuration) parameters, while complying with applicable standards, and can desirably (e.g., automatically, dynamically, efficiently, advantageously, beneficially, enhancedly, or optimally) allocate and/or configure reference signal resources and/or other resources on RANs, including RANs associated with different vendors, to achieve desirable configuration of reference signal resources and/or other resources on RANs (e.g., configuration that can ensure or maintain orthogonality associated with cells and resources) while reducing (e.g., minimizing) resource (e.g., CSI-RS resource or other resource) usage.

To that end, techniques that can desirably (e.g., automatically, dynamically, suitably, reliably, efficiently, enhancedly, and/or optimally) allocate and/or configure reference signal resources relating to CSI (CSI-RS resources) and/or other resources on a RAN of a communication network are presented. A system can comprise a resource management component that can desirably manage and automate allocation and/or configuration of respective reference signal resources and/or other resources on respective cells of the RAN, for one or more RANs associated with one or more entities (e.g., one or more vendors, operators, or other entities). In some embodiments, the resource management component can be associated with the RAN(s) (e.g., part of an SMO component associated with the RAN(s)). In other embodiments, the resource management component can be part of another component, such as a controller (e.g., RAN intelligent controller (RIC)) associated with the RAN(s)), or can be located or situated elsewhere in or associated with the communication network.

The resource management component can comprise a profile component that can determine, design, and/or generate (e.g., create, construct, build, or produce) or facilitate designing and generating respective reference signal profiles relating to respective reference signal resources (e.g., CSI-RS resources or other type of reference signal resources) and/or other respective resources that can be used to configure the one or more RANs. As part of the determination, design, and/or generation of the respective reference signal profiles, the respective reference signal profiles can be associated with (e.g., mapped or linked to, or otherwise associated with) respective profile index values. The profile component and/or a user (e.g., SMO operator or other user) utilizing the profile component can determine, design, and/or generate the respective reference signal profiles such that each reference signal profile can comprise a ZP reference signal (e.g., a ZP-CSI-RS) resource and a non-zero power (NZP) reference signal (e.g., a NZP-CSI-RS) resource that can be orthogonal to the ZP reference signal resource, such as described herein.

In some embodiments, the resource management component and/or the RAN (e.g., the RAN, base station(s), or the cells of the RAN employing a neighbor relation component) can employ an automatic neighbor relation (ANR) function or other automated cell relation detection and identification function or tool that can determine or detect (e.g., automatically determine or detect) relationships (e.g., locational, spatial, physical, and/or logical relationships) between cells, including neighbor cells (e.g., cells neighboring or adjacent cells) that neighbor or are adjacent to a cell. Based at least in part on such detection of cell relationships between cells, the resource management component can generate cell relation topology information that can indicate the respective relationships between the respective cells of the RAN. In other embodiments, a user can analyze information relating to the cells of the RAN, and can determine cell-related information or cell relation topology information that can indicate the respective relationships between the respective cells of the RAN, and the resource management component can receive such cell-related information or cell relation topology information from the user. The resource management component can utilize the cell relation topology information to facilitate determining profile type selection, resource allocation, and configuration of resources on cells, such as described herein.

The resource management component also can comprise an allocator component that can allocate (e.g., automatically, dynamically, efficiently, enhancedly, or optimally allocate) the respective reference signal profiles associated with the respective profile index values to the respective cells associated with the RAN (e.g., for one or more RANs) based at least in part on the respective profile index values associated with a profile type that can be determined, from a group of profile types, based at least in part on the cell relation topology information relating to (e.g., indicating) the topology of the cells of the RAN and/or the cells of the communication network. The allocator component can perform the allocation to result in respective ZP reference signal resources, associated with the respective reference signal profiles allocated to respective adjacent cells of the respective cells, being orthogonal with respect to each other, such as described herein.

The resource management component further can comprise an adapter component (e.g., a translator components) that, for each of the respective reference signal profiles allocated to the respective cells associated with the RAN, can translate or adapt the profile information (e.g., parameters and/or other profile information) of the reference signal profile to generate translated profile information, based at least in part on a translation function associated with (e.g., applicable to) the RAN, such that the translated profile information can be in a desired format (e.g., a desired defined profile information and/or configuration format) that can be compatible with the RAN (e.g., a desired configuration model-specific syntax associated with the RAN and/or associated vendor). The resource management component further can comprise a configuration component (which also can be referred to as a configurator component or configurator). Based at least in part on the respective translated profile information of the respective reference signal profiles, the configuration component can configure respective parameters of the respective resources, comprising the respective ZP reference signal resources and the respective NZP reference signal resources, associated with the respective reference signal profiles on the respective cells associated with the RAN.

The disclosed subject matter, by employing the resource management component and the techniques described herein, can desirably (e.g., suitably, efficiently, enhancedly, or optimally) automate allocation and/or configuration of reference signal resources and/or other resources on RANs, reduce complexity of reference signal configuration parameters for cells of RANs, while complying with applicable standards, shield the end user (e.g., operator associated with a RAN) from the complexities of reference signal resource configuration while providing desirable configuration of reference signal resources on RANs, and/or leverage ANR tools (or other automated cell relation detection and identification function or tool) to facilitate selection of profile type (e.g., CSI-RS profile type), and allocation of unique profile index values (and associated reference signal profiles) on top of the ANR output (e.g., cell-related information and/or cell relation topology information). The disclosed subject matter, by employing the resource management component and the techniques described herein, can thereby enable significantly faster turn-around time (e.g., time to allocate resources and configure resources on the cells) and reduce chance for error (as compared to existing techniques), which can enhance (e.g., improve or maximize) throughput, and can enable re-allocation and reconfiguration of resources on cells automatic and fault-proof, or at least virtually fault-proof. Further, the disclosed subject matter, by employing the resource management component and the techniques described herein, can enable enhanced resource allocation and configuration on cells in all or at least a wide variety of scenarios, including scenarios where a particular cell of a RAN is only temporarily out of service.

These and other aspects and embodiments of the disclosed subject matter will now be described with respect to the drawings.

Referring now to the drawings, FIG. 1 illustrates a block diagram of a non-limiting example system 100 that can desirably (e.g., automatically, dynamically, predictively, suitably, reliably, efficiently, enhancedly, and/or optimally) manage and perform allocation and/or configuration of reference signal resources relating to CSI (CSI-RS resources) and/or other resources on one or more RANs of a communication network, in accordance with various aspects and embodiments of the disclosed subject matter. The system 100 can comprise a communication network 102 that can comprise a core network 104 and one or more radio access networks (RANs), such as RAN 106, that can be associated with (e.g., communicatively connected to) the core network 104. Each RAN (e.g., RAN 106) can comprise one or more base stations, such as, for example, base station 108 and base station 110, that each can comprise one or more cells, such as cell 112, cell 114, cell 116, and/or cell 118. In some embodiments, cells 112 and 114 can be associated with the base station 108, and cells 116 and 118 can be associated with the base station 110.

The core network 104, the one or more RANs (e.g., RAN 106), the one or more base stations (e.g., base stations 108 and 110), and the one or more cells (e.g., cells 112, 114, 116, and/or 118) can facilitate (e.g., enable) wireless communication of data (e.g., voice or other audio data, video data, textual data, or other data) between devices (e.g., communication devices or UEs), such as devices associated with the core network 104, via the one or more RANs, one or more base stations, and one or more cells, and other devices associated with the core network 104 or, more generally, the communication network 102 (e.g., a device, such as a server or computer, can be connected to the communication network 102 via a wireline connection or via a network other than the core network 104).

The devices can comprise, for example, devices 120 and/or 122. A device (e.g., 120 or 122) can be, for example, a wireless, mobile, or smart phone, a computer, a laptop computer, a server, an electronic pad or tablet, a virtual assistant (VA) device, electronic eyewear, an electronic watch, or other electronic bodywear, an electronic gaming device, an Internet of Things (IoT) device (e.g., a health monitoring device, a toaster, a coffee maker, blinds, a music player, speakers, a telemetry device, a smart meter, a machine-to-machine (M2M) device, or other type of IoT device), a device of a connected vehicle (e.g., car, airplane, train, rocket, and/or other at least partially automated vehicle (e.g., drone)), a personal digital assistant (PDA), a dongle (e.g., a universal serial bus (USB) or other type of dongle), a communication device, or other type of device. In some embodiments, the non-limiting term user equipment (UE) can be used to describe the device. The device (e.g., 120 or 122) can be associated with (e.g., communicatively connected to) the communication network 102 via a communication connection and channel, which can include a wireless or wireline communication connection and channel.

In accordance with various embodiments, the core network 104 can comprise various network components that can facilitate wireless communication of data. In some embodiments, the RAN 106 can be a 5G or other NR RAN (e.g., gNB or other NR-type or xG RAN, wherein x can be a number greater than 5), and/or the base station(s) (e.g., base station 108 and/or base station 110) can be a 5G or other NR base station (e.g., gNB or other NR-type or xG base station, wherein x can be a number greater than 5). In certain embodiments, the core network 104 can comprise a UPF node, an access and mobility management function (AMF) node, and/or other network functions. The UPF node can connect to or interface with the one or more RANs (e.g., RAN 106) and the one or more base stations (e.g., base station 108 or base station 110), can be an interconnect point between the core network and a data network (DN), can provide or facilitate providing a protocol data unit (PDU) session anchor point for providing mobility associated with radio access technologies (RATs), can provide or facilitate providing data packet routing or forwarding, and/or can perform or manage other functions. The AMF node can be a control plane function that can manage registration and deregistration of devices (e.g., devices 120 and/or 122) with the core network 104, manage connections of devices with the core network 104, manage mobility associated with devices (e.g., maintain knowledge of locations of devices, update locations of devices), and/or manage or perform other functions. In accordance with various other embodiments, the RAN(s) (e.g., RAN 106) and/or the base station (s) (e.g., base station 108 and/or base station 110) can be a $4^{th}$ generation (4G) long term evolution (LTE) RAN or base station, or the RAN or base station can comprise 4G LTE technology and functions, and 5G or other NR-type or xG technology and functions.

The communication network 102, more generally, or the core network 104 can comprise various other network equipment (e.g., routers, gateways, transceivers, switches, access points, network functions, processor components, data stores, or other devices or network nodes) that facilitate (e.g., enable) communication of information between respective items of network equipment of the communication network 102, and/or communication of information between the one or more devices (e.g., devices 120 and/or 122) and the communication network 102. The communication network 102, including the core network 104, can provide or facilitate wireless or wireline communication connections and channels between the one or more devices (e.g., devices 120 and/or 122), and/or respectively associated services or applications, and the communication network 102. For reasons of brevity or clarity, some of the various network equipment, components, functions, or devices of the communication network may not be explicitly shown or described herein.

At various times, the respective devices (e.g., devices 120 and/or 122) can utilize respective services. The services can comprise or relate to, for example, voice service (e.g., conversational voice services or other voice services), video streaming service, conversational video service, buffered video service, audio streaming service, other type of streaming service, text or messaging service, data service, control message service (e.g., control message service relating to control of communication network functions and operations), signaling service, real time gaming service, interactive gaming service, transmission control protocol (TCP) service, control message service relating to automated or semi-automated vehicles or motorized devices, law enforcement-related service, medical-related service, emergency-related service, military-related service, background traffic service, or other desired types of service.

As disclosed, some existing techniques for allocating and configuring resources, such as CSI-RS resources, on a RAN can be undesirably (e.g., inefficiently, unsuitably, or suboptimally) complex, as such existing techniques may not be standardized and can involve an end user (e.g., an SMO operator or other type of end user) having to have in-depth training on how 3GPP standards (e.g., technical specifications) work in order to understand the RAN interface, including the capability limitations of the RAN. The end user also typically has to understand in-depth the applicable standards in order to select a desirable (e.g., suitable, proper, or optimal) CSI-RS resource allocation and configuration scheme, and a desirable selection of resources, to achieve maximal radio performance (e.g., throughput, latency, or battery usage of the device) while minimizing overhead and resource usage. The disclosed subject matter (e.g., the systems (e.g., the system 100), methods, and techniques disclosed herein) can address and overcome these and other deficiencies and challenges of these existing techniques with regard to allocation and/or configuration of reference signal resources (e.g., reference signal resources relating to CSI (CSI-RS resources)) and/or other resources on RANs of a communication network.

To that end, the system 100 can comprise a resource management component 124 that can (e.g., automatically, dynamically, suitably, reliably, efficiently, enhancedly, and/or optimally) allocate and/or configure reference signal resources relating to CSI (CSI-RS resources) and/or other resources on one or more RANs (e.g., RAN 106) of the communication network 102, in accordance with the defined resource management criteria. The one or more RANs (e.g., RAN 106) can be associated with one or more entities (e.g., one or more vendors, operators, or other entities). In some embodiments, the resource management component 124 can be associated with the RAN(s) (e.g., can be part of an SMO component associated with the RAN(s)), such as described herein. In other embodiments, the resource management component 124 can be part of another component, such as a controller (e.g., RIC), associated with the RAN(s)), or can be located or situated elsewhere in or associated with the communication network 102.

Figure 2:
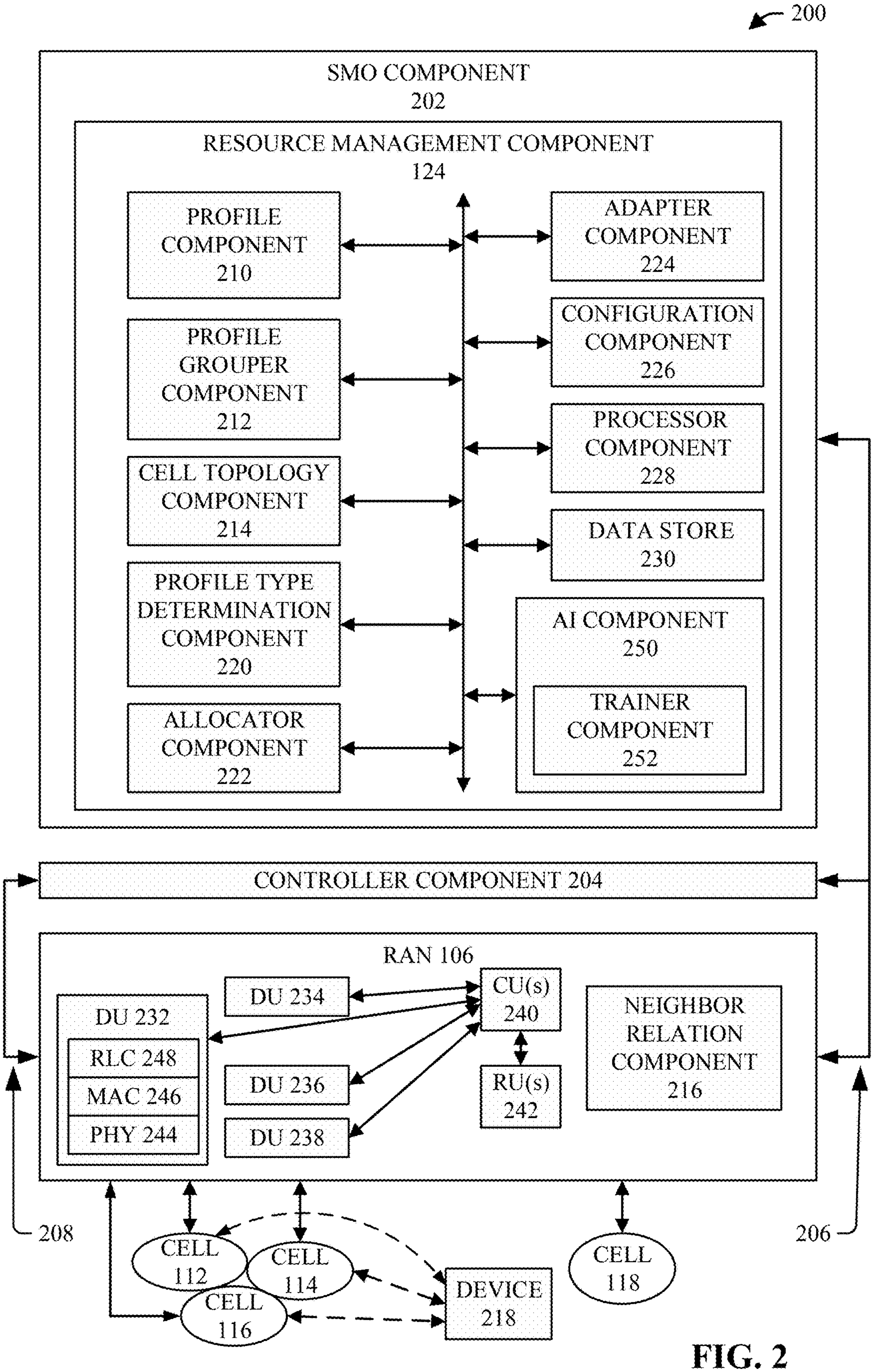
FIG. 2 depicts a block diagram of non-limiting example system that can comprise a resource management component, in accordance with various aspects and embodiments of the disclosed subject matter.

Referring to FIG. 2 (along with FIG. 1), FIG. 2 depicts a block diagram of non-limiting example system 200 that can comprise the resource management component 124, in accordance with various aspects and embodiments of the disclosed subject matter. In some embodiments, the system 200 can be part of the system 100 depicted in FIG. 1. In certain embodiments, the system 200 can comprise an SMO component 202, a controller component 204, and the RAN 106, wherein the SMO component 202 can comprise the resource management component 124. In other embodiments, the resource management component 124 can reside in another location (e.g., another physical or logical location) of or associated with the communication network 102, and can be associated with (e.g., communicatively connected to) the SMO component 202, the controller component 204, and/or the RAN 106. The RAN 106 can comprise the cells, including cells 112, 114, 116, and/or 118. In some embodiments, the communication network 102 can employ an open RAN (O-RAN) architecture that can comprise the SMO component 202 (e.g., an SMO platform), the controller component 204 (e.g., a RIC), and one or more RANs (e.g., the RAN 106), wherein the one or more RANs can be O-RANs.

In accordance with various embodiments, the SMO component 202 can be associated with (e.g., communicatively connected to or interfaced with) the controller component 204 and/or the RAN 106 via an interface(s), such as an O1 interface 206 (and/or an A1 interface), to facilitate communication of information between the SMO component 202 and the controller component 204 and/or the RAN 106. The controller component 204 can be associated with the RAN 106 via an interface(s), such as an E2 interface 208, to facilitate communication of information between the controller component 204 and the RAN 106.

In some embodiments, the resource management component 124 can comprise a profile component 210 that can determine, design, and/or generate (e.g., create, construct, build, or produce) or facilitate determining, designing, and/or generating respective reference signal profiles (e.g., CSI-RS profiles) associated with respective profile index values (e.g., CSI-RS profile index values) and respective characteristics such that, within the respective reference signal profiles, respective ZP reference signal resources (e.g., ZP-CSI-RS resources) can be orthogonal to respective NZP reference signal resources (e.g., NZP-CSI-RS resources). For instance, with regard to each reference signal profile associated with each profile index value and associated with each cell, the profile component 210 and/or a user utilizing the profile component 210 can determine, design, structure, and/or generate each reference signal profile such that a ZP reference signal resource and a NZP reference signal resource of the reference signal profile can be orthogonal with respect to each other (e.g., with regard to each ZP reference signal resource and NZP reference signal resource of the reference signal profile). The respective reference signal profiles can comprise respective profile information (e.g., parameters, such as RAN-specific parameters, and/or other profile information) relating to respective resources (e.g., ZP reference signal resources, NZP reference signal resources, and/or other resources) that can be utilized by respective cells (e.g., cells 112, 114, 116, and/or 118) of the RAN 106. The profile component 210 can determine, design, and/or generate the profile information of a reference signal profile in a desired defined format (e.g., a desired standardized format).

The resource management component 124 also can comprise a profile grouper component 212 that can group (e.g., aggregate, classify, arrange, or cluster) or facilitate grouping into respective groups of reference signal profiles associated with respective profile types of a group of profile types based at least in part on the respective characteristics. For instance, the profile grouper component 212 and/or the user utilizing the profile grouper component 212 can analyze the respective profile information of the respective reference signal profiles. Based at least in part on the results of such analysis, the profile grouper component 212 and/or the user utilizing the profile grouper component 212 can group respective groups of reference signal profiles associated with respective profile types based at least in part on the respective characteristics associated with the respective reference signal profiles. For instance, based at least in part on the results of such analysis, the profile grouper component 212 and/or the user utilizing the profile grouper component 212 can determine or identify reference signal profiles that can have (e.g., share, or have in common) the same, or at least substantially similar, characteristics as each other, and can group those reference signal profiles into a group of reference signal profiles associated with those characteristics and associated with a profile type. The characteristics can comprise or can relate to, for example, resources, ZP reference signal resources, NZP reference signal resources, periodicities associated with the resources, ZP reference signal pattern types, number of symbols or symbol location(s) of the symbol(s) associated with the resources, number of subcarrier locations for ZP reference signal resources (e.g., ZP CSI-RS or CSI-IM), number of locations for NZP reference signal resources, or resource usage of the resources, and/or other type of characteristic, associated with a reference signal profile.

For example, based at least in part on the results of such analysis, the profile grouper component 212 and/or the user utilizing the profile grouper component 212 can determine or identify that a first portion (e.g., respective first reference signal profiles) of the respective reference signal profiles are associated with a first group of characteristics (e.g., have the same characteristics of the first group of characteristics), a second portion (e.g., respective second reference signal profiles) of the respective reference signal profiles are associated with a second group of characteristics (e.g., have the same characteristics of the second group of characteristics), and/or another portion (e.g., respective other reference signal profiles) of the respective reference signal profiles are associated with another group of characteristics (e.g., have the same characteristics of the other group of characteristics). Accordingly, the profile grouper component 212 and/or the user utilizing the profile grouper component 212 can group the first portion associated with the first group of characteristics into a first group of reference signal profiles associated with the first group of characteristics and a first profile type of the group of profile types, the second portion of the respective reference signal profiles associated with the second group of characteristics into a second group of reference signal profiles associated with the second group of characteristics and a second profile type of the group of profile types, and/or the other portion of the respective reference signal profiles associated with the other group of characteristics into another group of reference signal profiles associated with the other group of characteristics and another profile type of the group of profile types.

Each of the groups of reference signal profiles and associated profile types can be associated with respective profile index values, wherein there can be respective numbers of respective profile index values for the respective groups of reference signal profiles and/or respective levels of resources (e.g., respective levels of resource usage) associated with the respective groups of reference signal profiles. For example, the first group of reference signal profiles associated with the first profile type can be associated with a first number of profile index values (e.g., three profile index values), wherein the first group of reference signal profiles can comprise a first reference signal profile associated with a first profile index value, a second reference signal profile associated with a second profile index value, and a third reference signal profile associated with a third profile index value. The second group of reference signal profiles associated with the second profile type can be associated with a second number of profile index values (e.g., six or another desired number of profile index values), wherein the respective second reference signal profiles of the second group of reference signal profiles can be associated with respective profile index values (e.g., respective profile index values that can be from one to six). In certain embodiments, the profile component 210, the profile grouper component 212, and/or the user can index the respective reference signal files into the respective groups of reference signal profiles by the tuple {profile type, profile index value} or can index them in another desired manner.

The determination, structuring (e.g., arrangement), and/or generation of the respective reference signal profiles (e.g., by the profile component 210 and/or the user), the grouping of the respective reference signal profiles into respective groups of reference signal profiles associated with respective profile types (e.g., by the profile grouper component 212 and/or the user utilizing the profile grouper component 212), and/or the assignment of respective profile index values to the respective reference signal profiles of each group of reference signal profiles associated with each profile type (e.g., by the profile component 210, the profile grouper component 212 and/or the user) can be performed such that, with regard to each group of reference signal profiles associated with a profile type, the respective ZP reference signal resources associated with respective reference signal profiles associated with respective (e.g., different) profile index values desirably (e.g., suitably, wantedly, enhancedly, or optimally) can be orthogonal to each other, and, in certain embodiments, with regard to the respective groups of reference signal profiles associated with the respective profile types, at least some, or even all, of the respective ZP reference signal resources associated with the respective reference signal profiles of a first group associated with a first profile type desirably can be orthogonal to the respective ZP reference signal resources associated with the respective reference signal profiles of a second group associated with a second profile type. This can facilitate ensuring desired orthogonality between respective adjacent cells (e.g., adjacent, neighboring, or overlapping cells) of the RAN 106 (or another RAN) (e.g., ensuring desired orthogonality between respective ZP reference signal resources associated with adjacent cells of the RAN) when respective reference signal profiles associated with respective profile index values and associated with a profile type (or, in certain embodiments, more than one of the respective profile types) are allocated to respective cells, including respective adjacent cells, of the RAN 106 (or another RAN), such as described herein. This can be in addition to the determination, structuring, and/or generation of the respective reference signal profiles (e.g., by the profile component 210 and/or the user) to have respective ZP reference signal resources be orthogonal to respective NZP reference signal resources within each reference signal profile, such as described herein.

In some embodiments, the amount or level of resources (e.g., reference signal resources and/or other resources) associated with a profile type and associated group of reference signal profiles can be based at least in part on (e.g., can correlate or correspond to) the number of profile index values associated with the group of reference signal profiles. For instance, a lower number of profile index values (e.g., three profile index values) can be associated with (e.g., can correspond or correlate to) a relatively lower level (e.g., lower amount) of resource usage, and a relatively higher number of profile index values (e.g., three profile index values) can be associated with (e.g., can correspond or correlate to) a relatively higher level of resource usage. It can be desirable (e.g., wanted, suitable, or optimal) to utilize a lower (e.g., lowest) or reduced amount of resources when allocating and/or configuring resources, such as reference signal resources, on one or more RANs (e.g., RAN 106) of the communication network 102, such as described herein.

Figure 3:
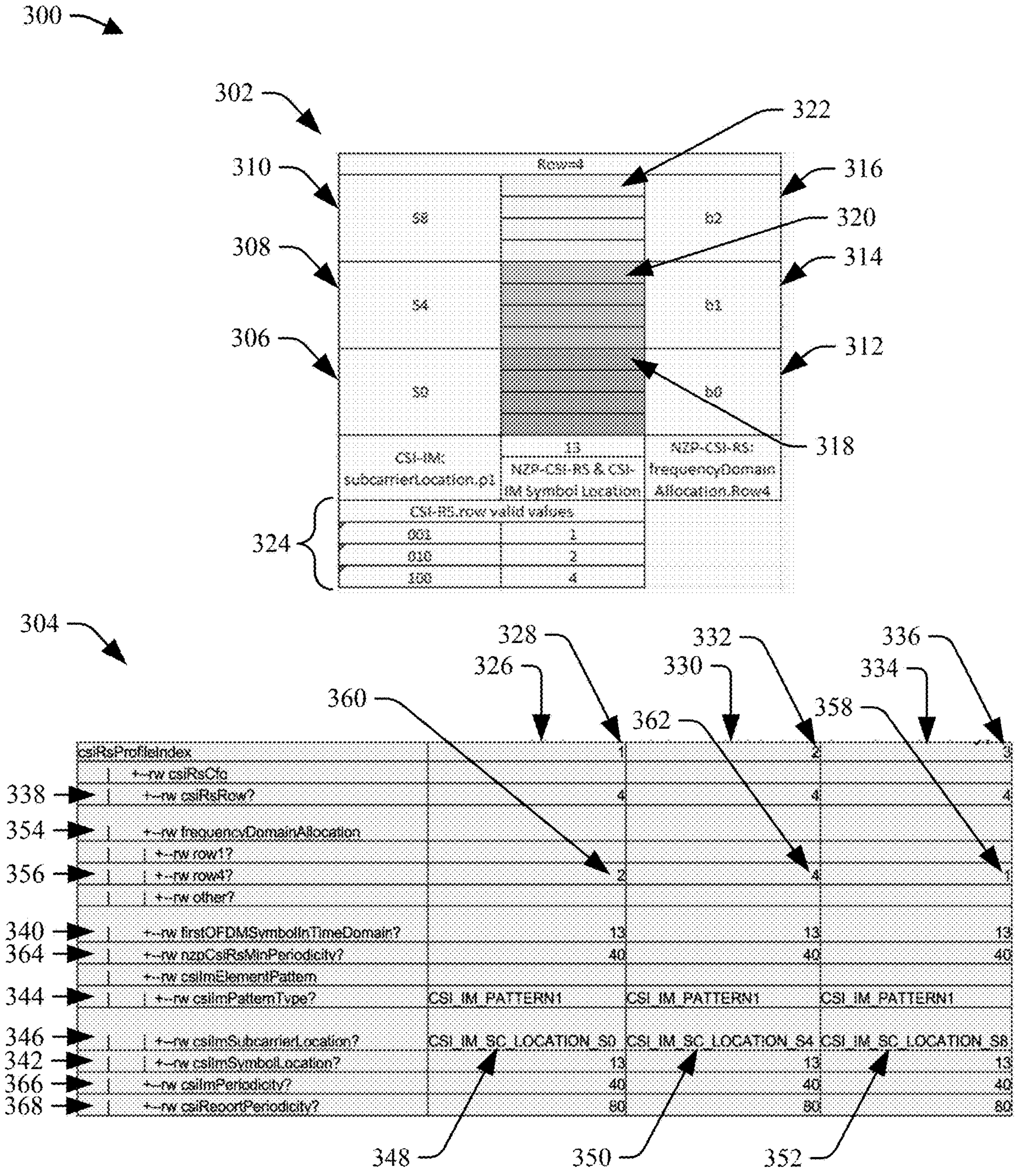
FIG. 3 presents a diagram of non-limiting example reference signal profiles that can be associated with a particular profile type (e.g., a relatively lower resource reference signal profile type) and can be associated with a relatively lower level or amount of resource usage (e.g., a lower or medium level of resource usage), in accordance with various aspects and embodiments of the disclosed subject matter.
Figure 4:
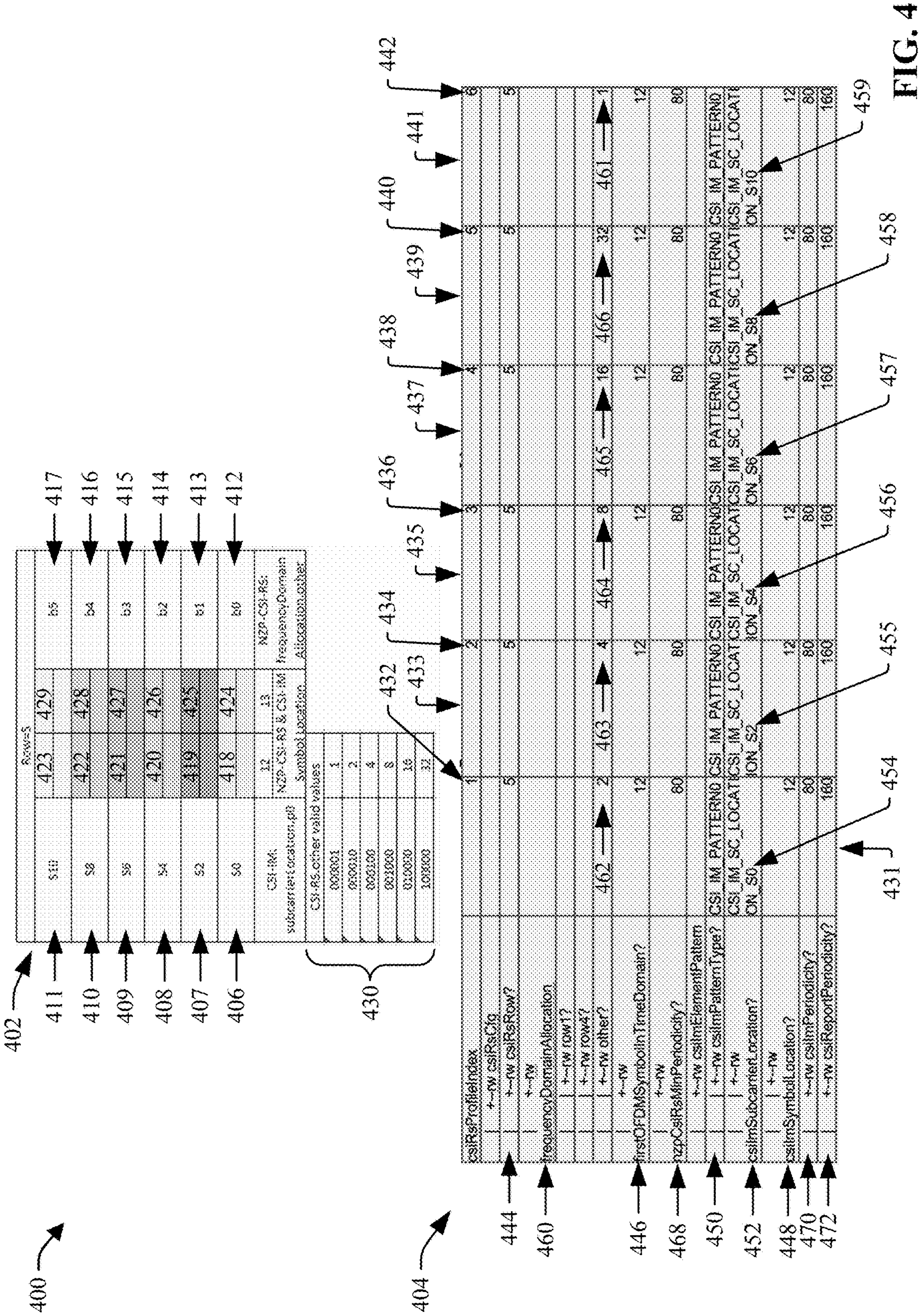
FIG. 4 presents a diagram of non-limiting example reference signal profiles that can be associated with a certain profile type (e.g., a relatively higher resource reference signal profile type) and can be associated with a relatively higher level or amount of resource usage, in accordance with various aspects and embodiments of the disclosed subject matter.

Referring to FIGS. 3, 4, and 5 (along with FIGS. 1 and 2), FIG. 3 presents a diagram of non-limiting example reference signal profiles 300 that can be associated with a particular profile type (e.g., a relatively lower resource reference signal profile type) and can be associated with a relatively lower level or amount of resource usage (e.g., a lower or medium level of resource usage), FIG. 4 presents a diagram of non-limiting example reference signal profiles 400 that can be associated with a certain profile type (e.g., a relatively higher resource reference signal profile type) and can be associated with a relatively higher level or amount of resource usage, and FIG. 5 presents a diagram of a non-limiting example reference signal locations table 500 that can comprise information relating to reference signal locations (e.g., CSI-RS locations) within a slot, in accordance with various aspects and embodiments of the disclosed subject matter. In some embodiments, the reference signal locations table 500 can be Table 7.4.1.5.3-1 of 3GPP TS 38.211, V16.6.0, such as depicted in FIG. 5. In other embodiments, the reference signal locations table 500 can be a differently structured reference signal locations table.

The example reference signal profiles 300, as depicted in FIG. 3, can comprise respective profile information of the respective reference signal profiles 300. The respective profile information can comprise or can be represented by a first pattern arrangement 302 for a first pattern (also referred to as Pattern 1 or CSI_IM_PATTERN1) and a row (e.g., a row, such as row 4, of a reference signal locations table of an applicable standard, such as such as Table 7.4.1.5.3-1 of 3GPP TS 38.211, V16.6.0) that can facilitate, and/or can be an example implementation of, CSI-RS resource allocation that can be associated with a cell (e.g., a cell to which one of the reference signal profiles 300 can be allocated or assigned), and a first table 304 that can be associated with the first pattern arrangement 302 and can indicate or specify respective parameter values associated with the respective profile index values of the respective reference signal profiles 300, in accordance with the guidelines of the applicable standard. The implementation scheme of the example reference signal profiles 300 can be a resource subset as permitted by the applicable standard associated with row 4, where only symbol 13 is utilized, wherein symbol 13 can be the symbol location for ZP-CSI-RS (which also can be referred to as CSI-IM) and NZP-CSI-RS. In this example case, the profile type for the example reference signal profiles 300 can be a lower (e.g., medium or low) CSI-RS profile type, as compared to the profile type of the reference signal profiles 400 of FIG. 4, which can be a relatively higher CSI-RS profile type. For instance, the example reference signal profiles 300 and associated lower profile type can relate to or involve a lower amount or level of resource usage (e.g., a lower amount or level of CSI-RS resource usage) than the reference signal profiles 400 and associated higher profile type.

It is to be appreciated and understood that, for reasons of brevity and clarity, the example reference signal profiles 300 of FIG. 3 are depicted only using row 4 of the table of the applicable standard, however, if and as desired, the resource management component 124 can determine, design, and/or generate, or can facilitate determining, designing, and/or generating, respective pattern arrangements and associated tables for a different row, other than row 4, of the table of the applicable standard or for respective rows for all or a desired portion of the rows of the table of the applicable standard. It also is to be appreciated and understood that, in other embodiments, a reference signal locations table other than Table 7.4.1.5.3-1 of 3GPP TS 38.211, V16.6.0 can be employed.

The first pattern arrangement 302 can comprise a column of CSI-IM subcarrier locations, comprising S0 306, S4 308, and S8 310. The first pattern arrangement 302 also can comprise a column of frequency domain allocations for NZP-CSI-RS (e.g., frequency domain allocations for row 4), comprising b0 312, b1 314, and b2 316. The regions (e.g., table cells of the first pattern arrangement 302), comprising region 318, region 320, and region 322 (and the other respective regions associated with the region 318, the region 320, or the region 322), in the middle column can be the frequency location and/or symbol location with regard to the NZP-CSI-RS and the CSI-IM. The region 318 (and the other respective regions associated therewith) can be associated with S0 306 and b0 312, the region 320 (and the other respective regions associated therewith) can be associated with S4 308 and b1 314, and region 322 (and the other respective regions associated therewith) can be associated with S8 310 and b2 316. In some embodiments, the applicable table of the applicable standard (e.g., Table 7.4.1.5.3-1 of 3GPP TS 38.211, V16.6.0) can provide a formula that can be utilized for mapping symbols to frequency and time (e.g., for row 4, with regard to $(\bar{k}, \bar{l})$ the formula can be $(k_0, l_0)$, $(k_0+2, l_0)$, wherein k can represent frequency and l can represent symbol. The CSI-RS row valid values can be, for example, 1 (001), 2 (010), and 4 (100), as indicated at reference numeral 324.

To ensure or achieve desired (e.g., wanted, required, useful, or optimal) orthogonality between the CSI-IM resources and the NZP-CSI-RS resources with the same cell (e.g., a cell to which one of the reference signal profiles 300 is allocated or assigned), the resource management component 124 (e.g., the profile component 210 and/or the profile grouper component 212) and/or the user utilizing the resource management component 124 can determine, design, generate, and/or group the reference signal profiles 300 to have the CSI-IM resource represented by S0 306 avoid the NZP-CSI-RS resource represented by b0 312, the CSI-IM resource represented by S4 308 avoid the NZP-CSI-RS resource represented by b1 314, and the CSI-IM resource represented by S8 310 avoid the NZP-CSI-RS resource represented by b2 316. By doing so, the respective ZP-CSI-RS resources (e.g., the respective CSI-IM resources) can be orthogonal to the respective NZP-CSI-RS resources within the respective reference signal profiles 300, and accordingly, within the cell to which one of the reference signal profiles 300 is allocated or assigned.

As disclosed, the example first table 304, which can be associated with the first pattern arrangement 302, can indicate respective parameter values associated with the respective profile index values of the reference signal profiles 300, in accordance with the guidelines of the applicable standard. This example first table 304 can provide an example of how a lower (e.g., medium or low) resource profile type associated with row 4 of the applicable table associated with the applicable standard can fill a subset of a generic configuration interface with regard to a cell to which one of the reference signal profiles 300 can be allocated or assigned.

The example first table 304 can comprise a first reference signal profile 326 that can be associated with a first profile index value 328 (e.g., csiRSProfileIndex 1), a second reference signal profile 330 that can be associated with a second profile index value 332 (e.g., csiRSProfileIndex 2), and a third reference signal profile 334 that can be associated with a third profile index value 336 (e.g., csiRSProfileIndex 3). The example first table 304 can indicate or specify that the reference signal profiles (e.g., 326, 330, and 334) can relate to row 4 of the applicable table of the applicable standard, as indicated at reference numeral 338 (e.g., rw csiRsRow). The example first table 304 also can indicate or specify that the reference signal profiles (e.g., 326, 330, and 334) can relate to symbol 13 of the applicable table of the applicable standard, as indicated at reference numerals 340 and 342 (e.g., row for first orthogonal frequency division multiplexing (OFDM) symbol in time domain (rw firstOFDMSymbolInTimeDomain) and row for CSI-IM symbol location (rw csiImSymbolLocation, respectively). The example first table 304 further can indicate or specify the pattern type 344 (e.g., rw csiImPatternType) of the reference signal profiles (e.g., 326, 330, and 334), which can be the first pattern (e.g., first pattern arrangement 302 (e.g., CSI-IM_PATTERN1)), with respect to the row (e.g., row 4).

The example first table 304 also can indicate or specify that the CSI-IM frequency domain can be represented by the CSI-IM subcarrier location 346 (e.g., rw csiIMSubcarrier-Location), wherein the first reference signal profile 326 can be associated with the CSI-IM subcarrier location S0 306 (e.g., CSI_IM_SC_LOCATION_S0 348), the second reference signal profile 330 can be associated the CSI-IM subcarrier location S4 308 (e.g., CSI_IM_SC_LOCATION_S4 350), and the third reference signal profile 334 can be associated with S8 310 (e.g., CSI_IM_SC_LOCATION_S8 352). As indicated in the first table 304, the NZP-CSI-RS frequency domain (e.g., rw frequencyDomainAllocation 354) can be represented by row 4 (e.g., rw row4 356), with the location b0 312, location b1 314, and location b2 316 respectively mapping to value 1 358, value 2 360, and value 4 362, such that the first profile index value 328 (e.g., csiRSProfileIndex 1) and associated first reference signal profile 326 can be associated with the value 2 360 associated with location b1 314, the second profile index value 332 (e.g., csiRSProfileIndex 2) and associated second reference signal profile 330 can be associated with the value 4 362 associated with location b2 316, and the third profile index value 336 (e.g., csiRSProfileIndex 3) and associated third reference signal profile 334 can be associated with the value 1 358 associated with location b0 312. This can ensure that desired orthogonality can be achieved and maintained between the respective CSI-IM resources and the respective NZP-CSI-RS resources of the respective reference signal profiles (e.g., 326, 330, and 334), as the CSI-IM resource represented by S0 306 can avoid the NZP-CSI-RS resource represented by b0 312 within the first reference signal profile 326 associated with the first profile index value 328, the CSI-IM resource represented by S4 308 can avoid the NZP-CSI-RS resource represented by b1 314 within the second reference signal profile 330 associated with the second profile index value 332, and the CSI-IM resource represented by S8 310 can avoid the NZP-CSI-RS resource represented by b2 316 within the third reference signal profile 334 associated with the third profile index value 336.

Other parameters can be either in function of expected capacity of the cell (e.g., a parameter(s), such as periodicity), or characteristics of row 4 (e.g., csiImPatternType). In some embodiments, in addition to containing respective profile information relating to respective ZP-CSI-RS (e.g., CSI-IM) resources and NZP-CSI-RS resources, the example first table 304 for the reference signal profiles (e.g., 326, 330, and 334) can include other profile information relating to certain other parameters (e.g., CSI-RS configuration, CSI-IM element pattern, NZP CSI-RS minimum periodicity, CSI-IM periodicity, CSI report periodicity, and/or other type of parameter). For instance, the example first table 304 can indicate or specify the NZP CSI-RS minimum periodicity 364 (e.g., rw nzpCsiRsMinPeriodicity), such as, for example, 40 milliseconds (ms) (or another desired periodicity), the CSI-IM periodicity 366 (e.g., rw csiImPeriodicity), such as, for example, 40 ms (or another desired periodicity), and/or the CSI report periodicity 368 (e.g., rw csiReportPeriodicity), such as, for example, 80 ms (or another desired periodicity), for the reference signal profiles (e.g., 326, 330, and 334), with regard to row 4. In other embodiments, the respective reference signal profiles (e.g., 326, 330, and 334) can comprise the respective profile information relating to respective ZP-CSI-RS (e.g., CSI-IM) resources and NZP-CSI-RS resources for the reference signal profiles, while not including some or all of the other parameters.

With further regard to the example reference signal profiles 400, as depicted in FIG. 4, the example reference signal profiles 400 can comprise respective profile information of the respective reference signal profiles 400. The respective profile information can comprise or can be represented by a second pattern arrangement 402 for a second pattern (also referred to as Pattern 0 or CSI_IM_PATTERN0) and a row (e.g., a row, such as row 5, of a reference signal locations table of an applicable standard, such as such as Table 7.4.1.5.3-1 of 3GPP TS 38.211, V16.6.0) that can facilitate, and/or can be an example implementation of, CSI-RS resource allocation that can be associated with a cell (e.g., a cell to which one of the reference signal profiles 400 can be allocated or assigned), and a second table 404 that can be associated with the second pattern arrangement 402 and can indicate or specify respective parameter values associated with the respective profile index values of the respective reference signal profiles 400, in accordance with the guidelines of the applicable standard. The implementation scheme of the example reference signal profiles 400 can be a desired resource subset as permitted by the applicable standard associated with row 5, where only symbols 12 and 13 are utilized, wherein symbols 12 and 13 can be the symbol locations for ZP-CSI-RS (which also can be referred to as CSI-IM) and NZP-CSI-RS. In this example case, the profile type for the example reference signal profiles 400 can be a higher CSI-RS profile type, as compared to the profile type of the reference signal profiles 300 of FIG. 3, which can be a relatively lower (e.g., medium or low) CSI-RS profile type. For instance, the example reference signal profiles 400 and associated higher profile type can relate to or involve a higher amount or level of resource usage (e.g., a higher amount or level of CSI-RS resource usage) than the reference signal profiles 300 and associated lower profile type.

It is to be appreciated and understood that, for reasons of brevity and clarity, the example reference signal profiles 400 of FIG. 4 are depicted only using row 5 of the table of the applicable standard, however, if and as desired, the resource management component 124 can determine, design, and/or generate, or can facilitate determining, designing, and/or generating, respective pattern arrangements and associated tables for a different row, other than row 5, of the table of the applicable standard or for respective rows for all or a desired portion of the rows of the table of the applicable standard. It also is to be appreciated and understood that, in other embodiments, a reference signal locations table other than Table 7.4.1.5.3-1 of 3GPP TS 38.211, V16.6.0 can be employed.

The second pattern arrangement 402 can comprise a column of CSI-IM subcarrier locations, comprising S0 406, S2 407, S4 408, S6 409, S8 410, and S10 411. The second pattern arrangement 402 also can comprise a column of frequency domain allocations for NZP-CSI-RS (e.g., frequency domain allocations for row 5), comprising b0 412, b1 413, b2 414, b3 415, b4 416, and b5 417. The regions (e.g., table cells of the second pattern arrangement 402), comprising regions 418, 419, 420, 421, 422, 423, 424, 425, 426, 427, 428, and 429 (and the other regions respectively associated with the regions 418 through 429), in the middle columns can be the frequency location and/or symbol location with regard to the NZP-CSI-RS and the CSI-IM, with respect to symbol 12 and symbol 13. The regions 418 and 424 (and the other respective regions associated therewith)

can be associated with S0 406 and b0 412, the regions 419 and 425 (and the other respective regions associated therewith) can be associated with S2 407 and b1 413, the regions 420 and 426 (and the other respective regions associated therewith) can be associated with S4 408 and b2 414, the regions 421 and 427 (and the other respective regions associated therewith) can be associated with S6 409 and b3 415, the regions 422 and 428 (and the other respective regions associated therewith) can be associated with S8 410 and b4 416, and the regions 423 and 429 (and the other respective regions associated therewith) can be associated with S10 411 and b5 417. In some embodiments, the applicable table of the applicable standard (e.g., Table 7.4.1.5.3-1 of 3GPP TS 38.211, V16.6.0) can provide a formula that can be utilized for mapping symbols to frequency and time (e.g., for row 5, with regard to $(\bar{k}, \bar{l})$ the formula can be $(k_0, l_0)$, $(k_0, l_0+1)$, wherein k can represent frequency and l can represent symbol. The CSI-RS row valid values can be, for example, 1 (000001), 2 (000010), 4 (000100), 8 (001000), 16 (010000), and 32 (100000), as indicated at reference numeral 430.

To ensure or achieve desired (e.g., wanted, required, useful, or optimal) orthogonality between the CSI-IM resources and the NZP-CSI-RS resources with the same cell (e.g., a cell to which one of the reference signal profiles 400 is allocated or assigned), the resource management component 124 (e.g., the profile component 210 and/or the profile grouper component 212) and/or the user utilizing the resource management component 124 can determine, design, generate, and/or group the reference signal profiles 400 to have the CSI-IM resource represented by S0 406 avoid the NZP-CSI-RS resource represented by b0 412, the CSI-IM resource represented by S2 407 avoid the NZP-CSI-RS resource represented by b1 413, the CSI-IM resource represented by S4 408 avoid the NZP-CSI-RS resource represented by b2 414, the CSI-IM resource represented by S6 409 avoid the NZP-CSI-RS resource represented by b3 414, the CSI-IM resource represented by S8 410 avoid the NZP-CSI-RS resource represented by b4 416, and the CSI-IM resource represented by S10 411 avoid the NZP-CSI-RS resource represented by b5 417. By doing so, the respective ZP-CSI-RS resources (e.g., the respective CSI-IM resources) can be orthogonal to the respective NZP-CSI-RS resources within the respective reference signal profiles 400, and accordingly, within the cell to which one of the reference signal profiles 400 is allocated or assigned.

As disclosed, the example second table 404, which can be associated with the second pattern arrangement 402, can indicate respective parameter values associated with the respective profile index values of the reference signal profiles 400, in accordance with the guidelines of the applicable standard. This example second table 404 can provide an example of how a higher resource profile type associated with row 5 of the applicable table associated with the applicable standard can fill a subset of a generic configuration interface with regard to a cell to which one of the reference signal profiles 400 can be allocated or assigned.

The example second table 404 can comprise a first reference signal profile 431 that can be associated with a first profile index value 432 (e.g., csiRSProfileIndex 1), a second reference signal profile 433 that can be associated with a second profile index value 434 (e.g., csiRSProfileIndex 2), a third reference signal profile 435 that can be associated with a third profile index value 436 (e.g., csiRSProfileIndex 3), a fourth reference signal profile 437 that can be associated with a fourth profile index value 438 (e.g., csiRSProfileIndex 4), a fifth reference signal profile 439 that can be associated with a fifth profile index value 440 (e.g., csiRSProfileIndex 5), and a sixth reference signal profile 441 that can be associated with a sixth profile index value 442 (e.g., csiRSProfileIndex 6). The example second table 404 can indicate or specify that the reference signal profiles (e.g., 431, 433, 435, 437, 439, and 441) can relate to row 5 of the applicable table of the applicable standard, as indicated at reference numeral 444 (e.g., rw csiRsRow). The example second table 404 also can indicate or specify that the reference signal profiles (e.g., 431, 433, 435, 437, 439, and 441) can relate to symbol 12 of the applicable table of the applicable standard, as indicated at reference numerals 446 and 448 (e.g., row for first OFDM symbol in time domain (rw firstOFDMSymbolInTimeDomain) and row for CSI-IM symbol location (rw csiImSymbolLocation, respectively), wherein symbol 12 can be the first OFDM symbol in the time domain, and wherein symbol 13 also can be utilized for the reference signal profiles 400. The example second table 404 further can indicate or specify the pattern type 450 (e.g., rw csiImPatternType) of the reference signal profiles (e.g., 431, 433, 435, 437, 439, and 441), which can be the second pattern (e.g., second pattern arrangement 402 (e.g., CSI-IM_PATTERN0)), with respect to the row (e.g., row 5).

The example second table 404 can indicate or specify that the CSI-IM frequency domain can be represented by the CSI-IM subcarrier location 452 (e.g., rw csiIMSubcarrier-Location), wherein the first reference signal profile 431 can be associated with the CSI-IM subcarrier location S0 406 (e.g., CSI_IM_SC_LOCATION_S0 454), the second reference signal profile 433 can be associated the CSI-IM subcarrier location S2 407 (e.g., CSI_IM_SC_LOCATION_S2 455), the third reference signal profile 435 can be associated with S4 408 (e.g., CSI_IM_SC_LOCATION_S4 456), the fourth reference signal profile 437 can be associated with S6 409 (e.g., CSI_IM_SC_LOCATION_S6 457), the fifth reference signal profile 439 can be associated with S8 410 (e.g., CSI_IM_SC_LOCATION_S8 458), and the sixth reference signal profile 441 can be associated with S10 411 (e.g., CSI_IM_SC_LOCATION_S10 459). As indicated in the second table 404, the NZP-CSI-RS frequency domain (e.g., rw frequencyDomainAllocation 460) can be represented by row 5 (e.g., rw row other, wherein "other" can be 5), with the location b0 412, location b1 413, location b2 414, location b3 415, location b4 416, and location b5 417 respectively mapping to value 1 461, value 2 462, value 4 463, value 8 464, value 16 465, and value 32 466, such that the first profile index value 432 (e.g., csiRSProfileIndex 1) and associated first reference signal profile 431 can be associated with the value 2 462 associated with location b1 413, the second profile index value 434 (e.g., csiRSProfileIndex 2) and associated second reference signal profile 433 can be associated with the value 4 463 associated with location b2 414, the third profile index value 436 (e.g., csiRSProfileIndex 3) and associated third reference signal profile 435 can be associated with the value 8 464 associated with location b3 415, the fourth profile index value 438 (e.g., csiRSProfileIndex 4) and associated fourth reference signal profile 437 can be associated with the value 16 465 associated with location b4 416, the fifth profile index value 440 (e.g., csiRSProfileIndex 5) and associated fifth reference signal profile 439 can be associated with the value 32 466 associated with location b5 417, and the sixth profile index value 442 (e.g., csiRSProfileIndex 6) and associated sixth reference signal profile 441 can be associated with the value 1 461 associated with location b0 412. This can ensure that desired orthogonality can be achieved and maintained between the respective CSI-IM resources and the respective NZP-CSI-RS resources of the respective reference signal profiles (e.g., 431, 433, 435, 437, 439, and 441), as the CSI-IM resource represented by S0 406 can avoid the NZP-CSI-RS resource represented by b0 412 within the first reference signal profile 431 associated with the first profile index value 432, the CSI-IM resource represented by S2 407 can avoid the NZP-CSI-RS resource represented by b1 413 within the second reference signal profile 433 associated with the second profile index value 434, the CSI-IM resource represented by S4 408 can avoid the NZP-CSI-RS resource represented by b2 414 within the third reference signal profile 435 associated with the third profile index value 436, the CSI-IM resource represented by S6 409 can avoid the NZP-CSI-RS resource represented by b3 415 within the fourth reference signal profile 437 associated with the fourth profile index value 438, the CSI-IM resource represented by S8 410 can avoid the NZP-CSI-RS resource represented by b4 416 within the fifth reference signal profile 439 associated with the fifth profile index value 440, and the CSI-IM resource represented by S10 411 can avoid the NZP-CSI-RS resource represented by b5 417 within the sixth reference signal profile 441 associated with the sixth profile index value 442.

Other parameters can be either in function of expected capacity of the cell (e.g., a parameter(s), such as periodicity), or characteristics of row 5 (e.g., csiImPatternType). In some embodiments, in addition to containing respective profile information relating to respective ZP-CSI-RS (e.g., CSI-IM) resources and NZP-CSI-RS resources, the example second table 404 for the reference signal profiles (e.g., 431, 433, 435, 437, 439, and 441) can include other profile information relating to certain other parameters (e.g., CSI-RS configuration, CSI-IM element pattern, NZP CSI-RS minimum periodicity, CSI-IM periodicity, CSI report periodicity, and/or other type of parameter). For instance, the example second table 404 can indicate or specify the NZP CSI-RS minimum periodicity 468 (e.g., rw nzpCsiRsMinPeriodicity), such as, for example, 80 ms (or another desired periodicity), the CSI-IM periodicity 470 (e.g., rw csiImPeriodicity), such as, for example, 80 ms (or another desired periodicity), and/or the CSI report periodicity 472 (e.g., rw csiReportPeriodicity), such as, for example, 160 ms (or another desired periodicity), for the reference signal profiles (e.g., 431, 433, 435, 437, 439, and 441), with regard to row 5. In other embodiments, the respective reference signal profiles (e.g., 431, 433, 435, 437, 439, and 441 can comprise the respective profile information relating to respective ZP-CSI-RS (e.g., CSI-IM) resources and NZP-CSI-RS resources for the reference signal profiles, while not including some or all of the other parameters.

In certain embodiments, the resource management component 124 can comprise a cell topology component 214 that can determine or receive cell relation topology information that can indicate or specify respective relationships (e.g., respective locational, physical, and/or logical relationships) between the respective cells (e.g., 112, 114, 116, and/or 118) of the RAN 106. In some embodiments, the cell topology component 214 can receive the cell relation topology information from a user (e.g., an operator or expert who can perform cell neighbor relation management planning, and can determine the respective relationships between the respective cells of the RAN 106 and generate the cell relation topology information), via interaction with the resource management component 124 or via a communication device associated with the resource management component 124, and can analyze the cell relation topology information to determine or identify the respective relationships between the respective cells of the RAN 106. In certain embodiments, the cell topology component 214 can receive cell-related information relating to the cells (e.g., 112, 114, 116, and/or 118) of the RAN 106 from the user (e.g., the operator or expert that can determine the respective relationships between the respective cells of the RAN 106 and generate the cell-related information), via interaction with the resource management component 124 or via the communication device associated with the resource management component 124, wherein the cell-related information can indicate the respective relationships between the respective cells of the RAN 106. The cell topology component 214 can analyze the cell-related information, and based at least in part on the results of such analysis, can determine or identify the respective relationships between the respective cells of the RAN 106 and/or generate the cell relation topology information.

In certain other embodiments, the cell topology component 214 and/or the RAN 106 (e.g., the RAN 106, base station(s), or the cells of the RAN 106 employing a neighbor relation component 216) can employ an automatic neighbor relation (ANR) function or other automated cell relation detection and identification function or tool that can determine or detect (e.g., automatically determine or detect) relationships (e.g., locational, spatial, physical, and/or logical relationships) between cells, including neighbor cells (e.g., cells neighboring or adjacent cells) that neighbor or are adjacent to a cell. The cell topology component 214 and/or the neighbor relation component 216 can detect one or more cells (e.g., cell 114 and/or cell 116) that can be adjacent to or can neighbor a cell (e.g., cell 112), such as neighbor or adjacent cells that can have respective cell coverage areas that can be adjacent, neighboring, and/or overlapping with respect to each other. The cell topology component 214 and/or the neighbor relation component 216 can receive (e.g., obtain) respective cell identification information and/or respective cell location information from respective cells (e.g., cells 112, 114, 116, and/or 118) and/or from a device 218 that can be associated with (e.g., communicatively connected to) one or more of the respective cells (e.g., a device 218 that can receive information, such as reports, that can comprise respective cell identification information and/or respective cell location information associated with respective cells). The respective cell identification information and/or respective cell location information associated with the respective cells can comprise, for example, a cell global identifier (CGI) (e.g., a new radio (NR) CGI (NCGI or NR-CGI), or other CGI) associated with a cell, a physical cell identity (PCI) associated with a cell, a public land mobile network (PLMN) identifier associated with a cell, and/or other identifier or information associated with a cell.

The cell topology component 214 and/or the neighbor relation component 216 can generate, update, and/or maintain (e.g., automatically or dynamically generate, update, and/or maintain) neighbor relations information, comprising respective cell identification information and/or respective cell location information, in a table(s), a list(s), or in another informational form, and can store the neighbor relations information in a data store. If a cell is added or removed, the cell topology component 214 and/or the neighbor relation component 216 can obtain information (e.g., cell identification information and/or cell location information) relating to the addition or removal of the cell, and can update the neighbor relations information (e.g., can update the neighbor relations table or list to account for the addition or removal of the cell, based at least in part on the obtained information). In some embodiments, if the neighbor relation component 216 has performed the detection or identification of the respective relationships between the respective cells (e.g., 112, 114, 116, and/or 118), the neighbor relation component 216 can communicate the cell-related information, comprising the neighbor relations information, to the cell topology component 214.

Based at least in part on the results of analyzing the cell-related information, comprising the neighbor relations information, associated with the respective cells (e.g., 112, 114, 116, and/or 118) the cell topology component 214 can determine or generate the cell relation topology information that can indicate, specify, or identify (e.g., automatically or dynamically indicate, specify, or identify) the respective cells, the respective locations of the respective cells, and/or the respective relationships (e.g., locational, spatial, physical, and/or logical relationships) between the respective cells associated with the RAN 106. For instance, in a non-limiting example scenario, based at least in part on the results of analyzing the cell-related information, the cell topology component 214 can determine or generate the cell relation topology information that can indicate, specify, or identify that cell 112, cell 114, and cell 116 are adjacent to or neighbor each other, and cell 118 is not adjacent to (e.g., does not neighbor) cells 112, 114, and 116 (e.g., when the cell-related information indicates such respective relationships between the respective cells).

In some embodiments, the resource management component 124 can comprise a profile type determination component 220 that, based at least in part on the results of analyzing the cell relation topology information and the respective groups of reference signal profiles associated with respective profile types, can determine and select (e.g., automatically or dynamically determine and select) a desirable (e.g., suitable, usable, or optimal) profile type, from the group of profile types, that can achieve and maintain the desired (e.g., wanted, required, suitable, or optimal) orthogonality between adjacent cells (e.g., cell 112, cell 114, and cell 116) of the respective cells of the RAN 106 (e.g., the desired orthogonality between respective ZP reference signal resources of the respective adjacent cells), while reducing or minimizing the amount of resource usage (e.g., the amount or level of usage of resources, such as ZP reference signal resources, NZP reference signal resources, and/or other type of resources), in accordance with the defined resource management criteria. In certain embodiments, the profile type determination component 220 (and/or another component of the resource management component 124) can employ (e.g., execute or utilize) a recursive allocation or reconfiguration algorithm that can determine a profile type and/or an allocation of respective profile index values associated with respective reference signal profiles that can be performed to have respective adjacent cells of a group (e.g., set) of adjacent cells of the RAN 106 have different profile index values, and accordingly, different reference signal profiles, allocated to the respective adjacent cells (e.g., neighbor cells can have different profile index values assigned to them, and another neighbor cell(s), if any, of one or more of those neighbor cells also can have a different profile index value assigned to it). In other embodiments, if desired, the profile type determination component 220 can allow a user (e.g., operator, expert, or other user) to determine and/or select the desirable profile type(s), from the group of profile types.

The profile type determination component 220 (and/or the user) typically can facilitate determining the profile type of the group of profile types to select and utilize by evaluating the lower (e.g., lowest available) resource profile type to see if the lower resource profile type is able to achieve the desired orthogonality between adjacent or neighbor cells, based at least in part on the cell relation topology information and the respective profile index values associated with the respective reference signal profiles of the group of reference signal profiles associated with the lower resource profile type. If the profile type determination component 220 (and/or the user) determines that the lower resource profile type is able to achieve the desired orthogonality between adjacent or neighbor cells, the profile type determination component 220 (and/or the user) can determine that the lower resource profile type can be selected (e.g., only the lower resource profile type has to be, or is to be, selected), as higher level resources associated with a higher resource profile type can be avoided (e.g., do not have to be used), since the desired orthogonality between adjacent cells can be achieved without using higher level resources. For instance, if, based at least in part on the results of analyzing the cell relation topology information (e.g., to determine which cells are adjacent to each other) and the respective profile index values associated with the respective reference signal profiles of the group of reference signal profiles associated with the lower resource profile type, the profile type determination component 220 (and/or the user) determines that different profile index values associated with the respective reference signal profiles of the group of reference signal profiles associated with the lower resource profile type can be allocated or assigned to a cell (e.g., cell 112) and all cells (e.g., cell 114 and cell 116) that are adjacent to, neighboring, and/or overlapping with the cell (e.g., cell 112), with regard to all cells of the RAN 106, the profile type determination component 220 (and/or the user) can determine that the lower resource profile type can be selected (e.g., only the lower resource profile type is to be selected).

For example, the example lower resource profile type presented with regard to the example reference signal profiles 300 of FIG. 3 can comprise three different profile index values, such as the first profile index value 328 (e.g., profile index 1), the second profile index value 332 (e.g., profile index 2), and the third profile index value 336 (e.g., profile index 3). With regard to adjacent cells 112, 114, and 116, based at least in part on the analysis results, the profile type determination component 220 (and/or the user) can determine that the first profile index value 328 can be allocated (e.g., assigned) to cell 112, the second profile index value 332 can be allocated to cell 114, and the third profile index value 336 can be allocated to cell 116, and thus, orthogonality can be achieved between those adjacent cells 112, 114, and 116 using only the lower resource profile type. If the profile type determination component 220 (and/or the user) determines that such the different profile index values (e.g., 328, 332, and 336) can be allocated to respective adjacent cells for all of the cells of the RAN 106, without any adjacent cells being assigned a same profile index value, the profile type determination component 220 (and/or the user) can determine that the lower resource profile type can be selected and utilized for the cells of the RAN 106, and no higher resource profile type has to be selected and utilized with regard to the cells of the RAN 106.

Figure 6:
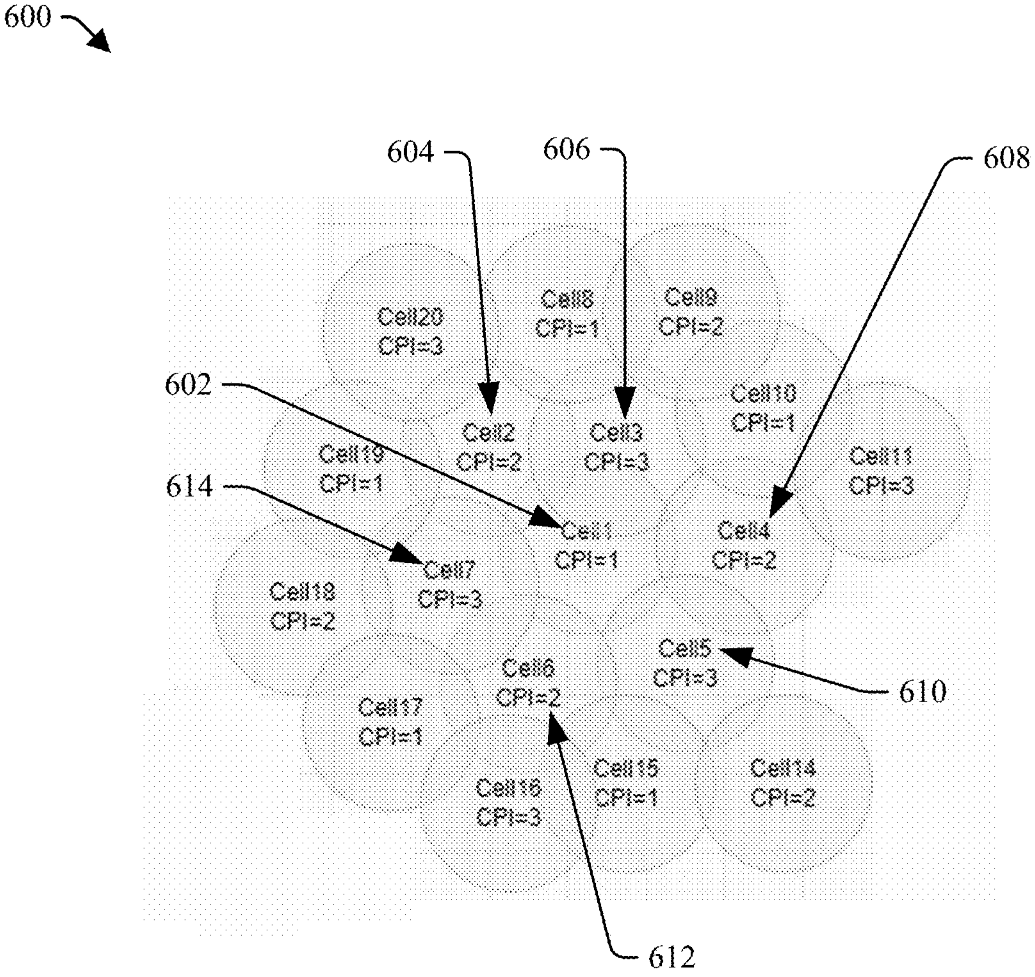
FIG. 6 depicts a diagram of an example group of cells of a RAN where a lower resource profile type can be utilized for allocation of reference signal profiles (e.g., associated with the lower resource profile type), in accordance with various aspects and embodiments of the disclosed subject matter.

Referring briefly to FIG. 6 (along with FIGS. 1-4), FIG. 6 depicts a diagram of an example group of cells 600 of a RAN (e.g., RAN 106 or another RAN) where a lower resource profile type can be utilized for allocation of reference signal profiles (e.g., associated with the lower resource profile type), in accordance with various aspects and embodiments of the disclosed subject matter. The group of cells 600 can comprise, for example, cell 602 (cell 1), cell

604 (cell 2), cell 606 (cell 3), cell 608 (cell 4), cell 610 (cell 5), cell 612 (cell 6), and cell 614 (cell 7), as well as the other cells presented in the group of cells 600.

Based at least in part on the results of analyzing cell relation topology information associated with the group of cells 600 and the respective profile index values associated with the respective reference signal profiles of the group of reference signal profiles associated with the lower resource profile type, the profile type determination component 220 (and/or the user) can determine, with regard to each cell of the group of cells 600, all cells adjacent to that cell, and can determine that different profile index values (e.g., 328, 332, and 336) associated with the lower resource profile type can be allocated to respective adjacent cells for all of the cells of the group of cells 600 of the RAN, without any adjacent cells being assigned the same profile index value. For example, with regard to cell 602, the profile type determination component 220 (and/or the user) can determine that cells 604, 606, 608, 610, 612, and 614 are adjacent to, neighboring, and/or overlapping with the cell 602. The profile type determination component 220 (and/or the user) also can determine that different profile index values (e.g., 328, 332, and 336) can be allocated to the cell 602 and its adjacent cells 604, 606, 608, 610, 612, and 614 (and similarly for all of the cells of the group of cells 600 of the RAN), without any of the adjacent cells 604, 606, 608, 610, 612, and 614 being assigned the same profile index value as the cell 602. For instance, the cell 602 can be assigned the first profile index value 328 (e.g., profile index 1, which also can be referred to as CSI-RS profile index (CPI)=1), the cells 604, 608, and 612 each can be assigned the second profile index value 332 (e.g., profile index 2, which also can be referred to as CPI=2), and cells 606, 610, and 614 each can be assigned the third profile index value 336 (e.g., profile index 3, which also can be referred to as CPI=3).

Based at least in part on the profile type determination component 220 (and/or the user) determining that different profile index values (e.g., 328, 332, and 336) associated with the lower resource profile type can be allocated to the respective adjacent cells for all of the cells of the group of cells 600 of the RAN, without any adjacent cells being assigned the same profile index value, the profile type determination component 220 (and/or the user) can determine that the lower resource profile type can be selected and utilized for the cells of the group of cells 600 of the RAN, and no higher resource profile type has to be selected and utilized with regard to the group of cells 600 of the RAN. The disclosed subject matter, with the profile type determination component 220 (and/or the user) being able to determine that the lower resource profile type can be selected and utilized for allocation of respective reference profiles to the respective cells (e.g., of. the group of cells 600) of the RAN (e.g., instead of a higher resource profile type), can desirably reduce or minimize the amount of resource usage at a desirably (e.g., suitably, enhancedly, or optimally) low level, while also ensuring orthogonality between respective adjacent cells (e.g., ensuring orthogonality between respective ZP reference signal resources associated with respective adjacent cells) of the group of cells 600.

Figure 7:
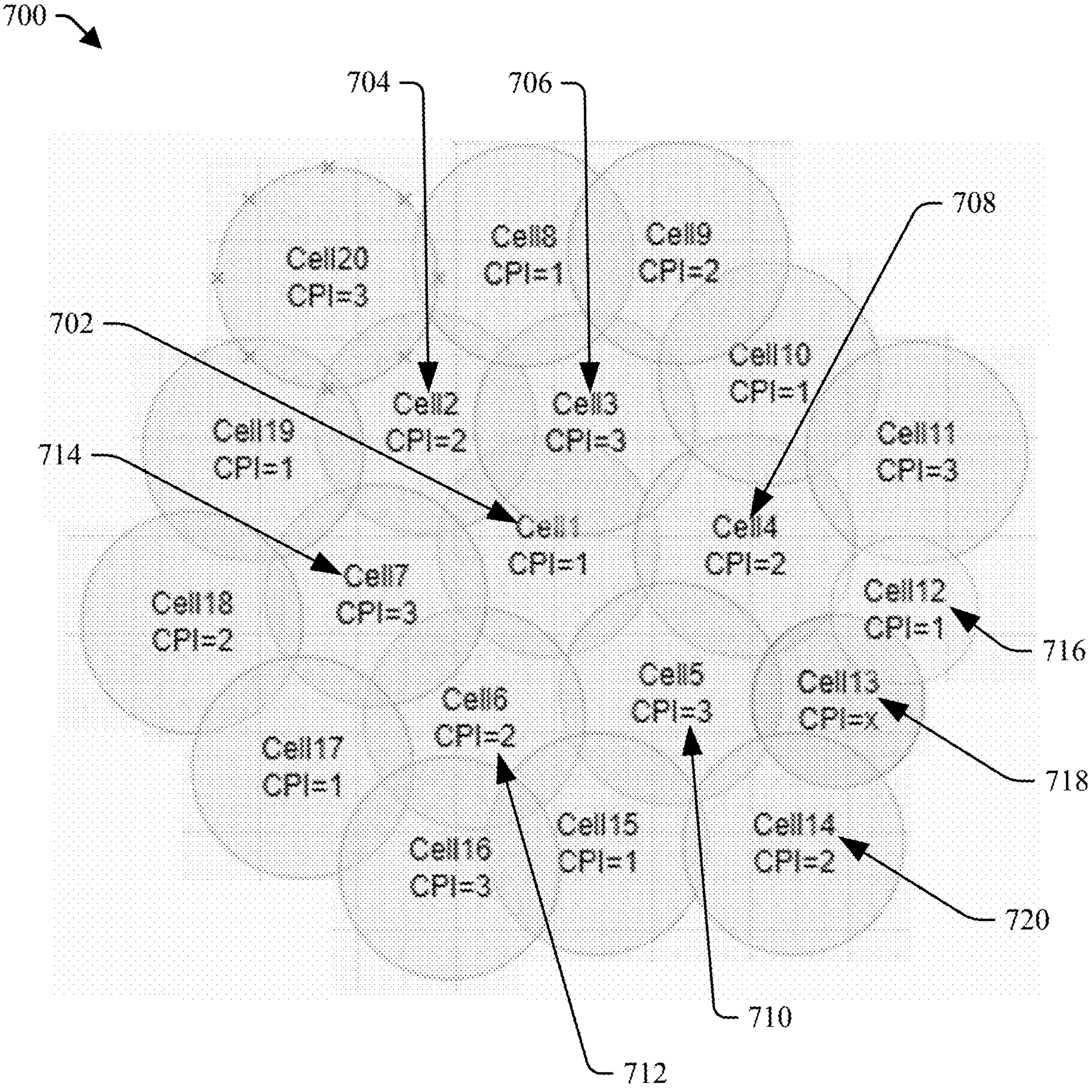
FIG. 7 depicts a diagram of an example group of cells of a RAN where a higher resource profile type can be utilized for allocation of reference signal profiles associated with the higher resource profile type, in accordance with various aspects and embodiments of the disclosed subject matter.

As a further illustration, turning to FIG. 7 (along with FIGS. 1-4), FIG. 7 depicts a diagram of an example group of cells 700 of a RAN (e.g., RAN 106 or another RAN) where a higher resource profile type can be utilized for allocation of reference signal profiles associated with the higher resource profile type, in accordance with various aspects and embodiments of the disclosed subject matter. The group of cells 700 can comprise, for example, cell 602 (cell 1), cell 704 (cell 2), cell 706 (cell 3), cell 708 (cell 4), cell 710 (cell 5), cell 712 (cell 6), cell 714 (cell 7), cell 716 (cell 12), cell 718 (cell 13), and cell 720 (cell 14), as well as the other cells presented in the group of cells 700 of that RAN.

In some embodiments, based at least in part on the results of analyzing cell relation topology information associated with the group of cells 700 and the respective profile index values associated with the respective reference signal profiles of the group of reference signal profiles associated with the lower resource profile type, the profile type determination component 220 (and/or the user) can determine, with regard to each cell of the group of cells 700, all cells adjacent to that cell, and can determine that, for all cells of the group of cells 700, except for cell 718, different profile index values (e.g., 328, 332, and 336) associated with the lower resource profile type can be allocated to respective adjacent cells for all of the cells of the group of cells 700, except for cell 718, without any adjacent cells being assigned the same profile index value associated with the lower resource profile type. For example, with regard to cell 702, the profile type determination component 220 (and/or the user) can determine that cells 704, 706, 708, 710, 712, and 714 are adjacent to, neighboring, and/or overlapping with the cell 702. The profile type determination component 220 (and/or the user) also can determine that different profile index values (e.g., 328, 332, and 336) associated with the lower resource profile type can be allocated to the cell 702 and its adjacent cells 704, 706, 708, 710, 712, and 714 (and similarly for all of the cells of the group of cells 700, except for cell 718), without any of the adjacent cells 704, 706, 708, 710, 712, and 714 being allocated the same profile index value as the cell 702. However, the profile type determination component 220 (and/or the user) can further determine that there is no profile index value associated with the lower resource profile type that can be allocated to the cell 718 that is different from cells 708, 710, 716, and 720 that are adjacent to cell 718, since the available profile index values (e.g., 328, 332, and 336) associated with the lower resource profile type are already respectively assigned to cells 708, 710, 716, and 720. As a result, the profile type determination component 220 (and/or the user) can determine that the lower resource profile type is not desirable (e.g., not wanted, not suitable, or not optimal) for allocation of respective profile index values and associated respective reference signal profiles to the respective cells of the group of cells 700 of that RAN.

The profile type determination component 220 (and/or the user) can evaluate a next higher resource profile type (e.g., the example higher resource profile type) to determine whether the next higher resource profile type can be desirable (e.g., wanted, suitable, or optimal) for allocation of respective profile index values and associated respective reference signal profiles, based at least in part on the results of analyzing the cell relation topology information associated with the group of cells 700 and the respective profile index values associated with the respective reference signal profiles of the group of reference signal profiles associated with the higher resource profile type. For instance, based at least in part on the analysis results, the profile type determination component 220 (and/or the user) can determine that, for all cells of the group of cells 700, different profile index values (e.g., 432, 434, 436, 438, 440, or 442) associated with the higher resource profile type can be allocated to respective adjacent cells for all of the cells of the group of cells 700, without any adjacent cells being assigned the same profile index value associated with the higher resource profile type. For example, with regard to cell 702, the profile type determination component 220 (and/or the user) can determine that different profile index values (e.g., 432, 434, and 436) associated with the higher resource profile type can be allocated to the cell 702 and its adjacent cells 704, 706, 708, 710, 712, and 714 (and similarly for all of the cells of the group of cells 700, except for cell 718), without any of the adjacent cells 704, 706, 708, 710, 712, and 714 being allocated the same profile index value as the cell 702. In certain embodiments, the profile type determination component 220 (and/or the user) can utilize the preliminary mapping of respective profile index values (e.g., profile index 1, profile index 2, and profile index 3) associated with the lower resource profile type to the respective cells of the group of cells 700 to facilitate determining (e.g., to efficiently and suitably determine) a desirable mapping of respective profile index values associated with the higher resource profile type to the respective cells of the group of cells 700 (e.g., profile index value 432 (e.g., CPI=1) mapped to cell 702, profile index value 434 (e.g., CPI=2) mapped to cell 704, profile index value 436 (e.g., CPI=3) mapped to cell 706, and so on). For instance, the profile type determination component 220 (and/or the user) can determine that the first profile index value 432 (e.g., profile index 1 or CPI=1) can be allocated to each of the cell 702 and 716, the second profile index value 434 (e.g., profile index 2 or CPI=2) can be allocated to each of the cells 704, 708, 712, and 720, the third profile index value 436 (e.g., profile index 3 or CPI=3) can be allocated to each of the cells 706, 710, and 714, and the fourth profile index value 438 (e.g., profile index 4 or CPI=4) can be allocated to the cell 718 (or, if desired, the fifth profile index value 440 or sixth profile index value 442 can be allocated to the cell 718).

In other embodiments, the profile type determination component 220 (and/or the user) can determine and/or select more than one profile type, if it is determined that one profile type (e.g., the example lower resource profile type) does not have sufficient respective profile index values and associated respective reference signal profiles to be able to make allocations of the respective profile index values to the respective cells of the RAN that can ensure desired orthogonality between respective adjacent cells of the RAN. For example, in some instances, due to respective relationships between respective cells of a RAN and the number of available and different profile index values, and accordingly, the number of available and different reference signal profiles, associated with a lower resource profile type, the profile type determination component 220 (and/or the user) may determine that orthogonality between adjacent cells of a particular RAN is not able to be achieved using only the available and different profile index values, and accordingly, the available and different reference signal profiles, associated with the lower resource profile type. In such instances, based at least in part on the results of analyzing the cell relation topology information associated with the cells of that particular RAN and the respective profile index values associated with the respective reference signal profiles of the group of reference signal profiles associated with the lower resource profile type, the profile type determination component 220 (and/or the user) can determine a desirable (e.g., suitable, maximum, or optimal) number of cells of the group of cells of the particular RAN that, for respective adjacent cells of the group of cells, can be allocated respective (e.g., different) profile index values associated with the lower resource profile type to achieve orthogonality between those respective adjacent cells, and can determine that such allocations of the respective profile index values associated with the lower resource profile type to those respective adjacent cells can be performed. This can leave a number (e.g., a smallest or minimal number) of remaining cells of the group of cells for which a profile index value associated with a reference signal profile associated with the lower resource profile type is not able to be allocated, as such allocation will not be able to ensure orthogonality between the remaining cell(s) and cells adjacent to the remaining cell(s). With regard to one or more remaining cells of the group of cells that the profile type determination component 220 (and/or the user) determines are not able to be allocated a profile index value associated with the lower resource profile type that is different from the profile index value assigned to an adjacent cell of the cell (of the one or more remaining cells), the profile type determination component 220 (and/or the user) can evaluate a higher resource profile type (e.g., a next higher level resource profile type than the lower resource profile type) and can determine, for each remaining cell of the one or more remaining cells, a profile index value associated with the higher resource profile type that can be allocated to the remaining cell to achieve orthogonality between the remaining cell and cells adjacent to that remaining cell (e.g., a profile index value associated with a reference signal profile associated with the higher resource profile type that can be allocated to the remaining cell to achieve orthogonality between the ZP reference signal resource associated with the remaining cell and the ZP reference signal resources associated with the cells adjacent to that remaining cell). Accordingly, the profile type determination component 220 (and/or the user) can determine that each remaining cell of the one or more remaining cells can be allocated the respective profile index value associated with the higher resource profile type that was determined by the profile type determination component 220 (and/or the user).

For instance, as disclosed with regard to the group of cells 700 of FIG. 7, based at least in part on the results of analyzing the cell relation topology information associated with the group of cells 700 and the respective profile index values associated with the respective reference signal profiles of the group of reference signal profiles associated with the lower resource profile type, the profile type determination component 220 (and/or the user) can determine, with regard to each cell of the group of cells 700, all cells adjacent to that cell, and can determine that, for all cells of the group of cells 700, except for cell 718, different profile index values (e.g., 328, 332, and 336) associated with the lower resource profile type can be allocated to respective adjacent cells for all of the cells of the group of cells 700, except for cell 718, without any adjacent cells being assigned the same profile index value associated with the lower resource profile type. For example, the profile type determination component 220 (and/or the user) can determine that the cell 702 can be allocated the first profile index value 328 (e.g., profile index 1 or CPI=1), the cells 704, 708, and 712 each can be allocated the second profile index value 332 (e.g., profile index 2 or CPI=2), and cells 706, 710, and 714 each can be allocated the third profile index value 336 (e.g., profile index 3 or CPI=3). Also, as part of the analysis, the profile type determination component 220 (and/or the user) can determine that the first profile index value 328 can be allocated to cell 716 and the second profile index value 332 can be allocated to cell 720.

Accordingly, the profile type determination component 220 (and/or the user) can determine that the lower resource profile type can be selected, and can determine that all of the cells (e.g., cells 720, 704, 706, 708, 710, 712, 714, 716, and 720, and other cells) of the group of cells 700, except for cell 718, can be allocated the respective profile index values associated with the lower resource profile type, as determined by the profile type determination component 220 (and/or the user), which can facilitate maintaining, reducing, or minimizing the amount of resource usage at a desirably (e.g., suitably, enhancedly, or optimally) low level, while also ensuring orthogonality between respective adjacent cells (e.g., ensuring orthogonality between respective ZP reference signal resources associated with respective adjacent cells) of the group of cells 700 (except for cell 718, as allocation for cell 718 has not been determined yet). In this non-limiting example case, the profile type determination component 220 (and/or the user) also has desirably maximized the number of cells that can be allocated respective reference signal profiles, and associated respective profile index values, associated with the lower resource profile type, and desirably minimized the number of remaining cells (e.g., cell 718) for which a profile index value associated with the lower resource profile type is not able to be allocated.

With regard to the remaining cell 718, the profile type determination component 220 (and/or the user) can determine that, since none of the profile index values associated with the lower resource profile type are able to be allocated to the remaining cell 718, in this non-limiting example case, a higher resource profile type (e.g., a next higher level resource profile type than the lower resource profile type) can be evaluated and/or utilized to facilitate allocation of a desirable (e.g., suitable or optimal) profile index value, and associated reference signal profile, associated with the higher resource profile type to the remaining cell 718. For instance, based at least in part on the results of analyzing the respective profile index values, and/or the respective reference signal profiles, associated with the lower resource profile type that are associated with (e.g., to be allocated) the respective cells (e.g., cell 708, cell 710, cell 716, and cell 720) determined to be adjacent to, neighboring, and/or overlapping with the remaining cell 718, and the respective profile index values, and/or the respective reference signal profiles, associated with the higher resource profile type, the profile type determination component 220 (and/or the user) can determine that the higher resource profile type can be selected for use with regard to the remaining cell 718, and can determine a desirable (e.g., suitable and/or optimal) profile index number, associated with a desirable (e.g., a different, suitable, and/or optimal) reference signal profile, associated with the higher resource profile type that can be allocated to the remaining cell 718 to achieve and/or ensure desired orthogonality between the remaining cell 718 and cells 708, 710, 716, and 720 adjacent to the remaining cell 718. For example, the profile type determination component 220 (and/or the user) can determine that the second profile index value 434, the fourth profile index value 438, the sixth profile index value 442, or another suitable profile index value associated with the higher resource profile type can be allocated to the remaining cell 718 to achieve and/or ensure desired orthogonality between the remaining cell 718 and cells 708, 710, 716, and 720 adjacent to the remaining cell 718 (e.g., to achieve and/or ensure desired orthogonality between the respective ZP reference signal resources associated with the respective cells 708, 710, 716, 718, and 720). For instance, the profile type determination component 220 (and/or the user) can determine that the second profile index value 434, associated with the second reference signal profile 433, associated with the higher resource profile type can be allocated to the remaining cell 718.

In certain embodiments, to facilitate ensuring orthogonality between adjacent cells of the RAN when more than one profile type is being utilized, the resource management component 124 (and/or a user) can determine, generate, and/or utilize a mapping of respective first profile index values and associated respective first reference signal profiles associated with a first profile type (e.g., the lower resource profile type) and respective second profile index values and associated respective second reference signal profiles associated with a second profile type (e.g., the higher resource profile type) that can map the respective orthogonality between {first profile type, profile index value X} and {second profile type, profile index value Y}, wherein X and Y can be desired respective numbers that can be different from or same as each other. The resource management component 124 (and/or a user) can consult or analyze such mapping between respective profile types to determine whether a particular profile index value and associated reference signal profile of the second profile type is orthogonal to a certain profile index value(s) and associated reference signal profile(s) of the first profile type.

With the respective allocations of the respective profile index values and associated respective reference signal profiles associated with the profile type to the respective cells determined and/or selected by the profile type determination component 220 (and/or the user), the resource management component 124, employing an allocator component 222, can allocate (e.g., automatically or dynamically allocate or assign) the respective profile index values and associated respective reference signal profiles associated with the profile type to the respective cells (e.g., cell 112, cell 114, cell 116, cell 118, and/or other cells) of the RAN 106.

The resource management component 124 also can comprise an adapter component 224 (e.g., translator component) that can translate the respective profile information (e.g., respective parameters and/or other respective profile information) of the respective reference signal profiles associated with the respective profile index values allocated to the respective cells (e.g., cell 112, cell 114, cell 116, cell 118, and/or other cells) of the RAN 106, based at least in part on a desired (e.g., suitable, applicable, or optimal) translation function, to generate respective translated profile information (e.g., respective translated parameters and/or other respective translated profile information) of the respective reference signal profiles associated with the respective profile index values allocated to the respective cells of the RAN 106, in accordance with a desired defined format (e.g., a desired defined profile information and/or configuration format) associated with (e.g., applicable to, compatible with, or suitable or optimal for) the RAN 106 (and/or a vendor associated with the RAN 106). The desired defined format can be or can relate to, for example, a desired configuration model-specific syntax associated with the RAN 106 and/or associated vendor.

Figure 8:
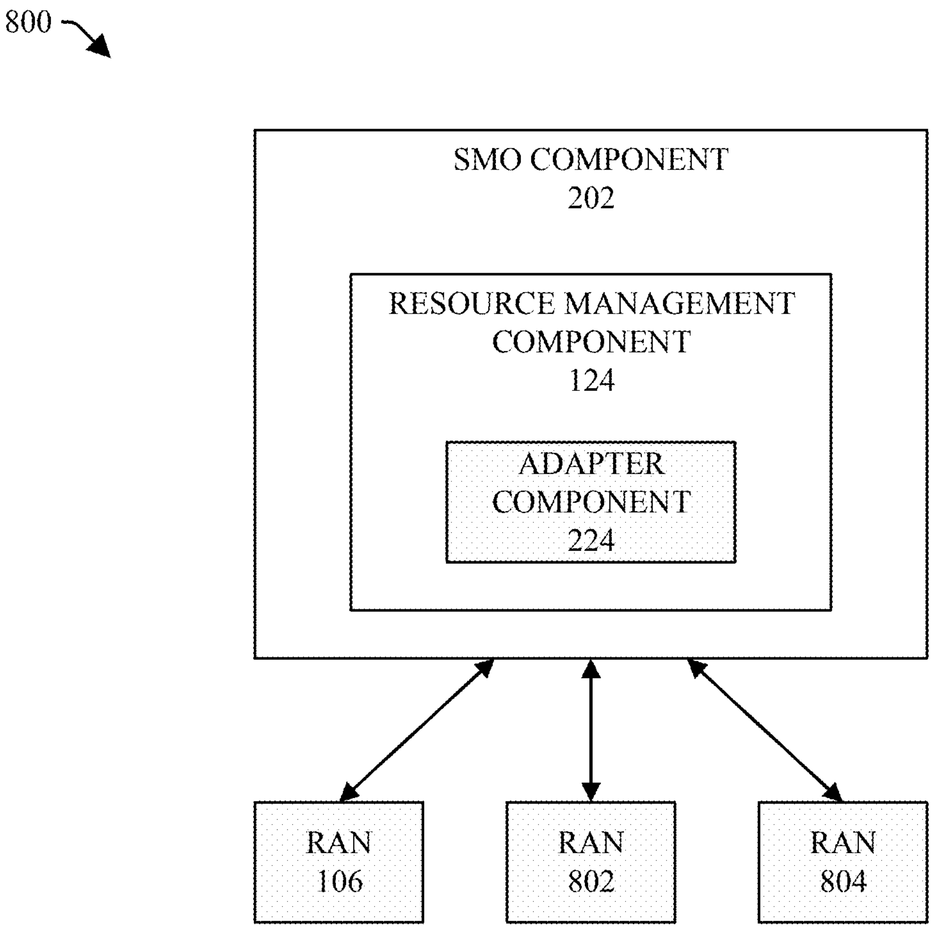
FIG. 8 illustrates a block diagram of a non-limiting example system that can translate respective profile information of respective reference signal profiles allocated to respective cells associated with respective RANs, in accordance with various aspects and embodiments of the disclosed subject matter.

Referring briefly to FIG. 8 (along with FIGS. 1 and 2), FIG. 8 illustrates a block diagram of a non-limiting example system 800 that can translate respective profile information of respective reference signal profiles allocated to respective cells associated with respective RANs (e.g., respective RANs associated with respective vendors or operators), in accordance with various aspects and embodiments of the disclosed subject matter. The system 800 can comprise the SMO component 202 and the controller component 204, which can be associated with (e.g., communicatively connected to) the SMO component 202 (e.g., via an interface, such as the O1 interface or the A1 interface), such as described herein. In some embodiments, the SMO component 202 can comprise the resource management component 124, which can include the adapter component 224, such as described herein. The system 800 also can comprise the RAN 106, RAN 802, and RAN 804 that can be associated with (e.g., communicatively connected to) the SMO component 202 and the controller component 204 via one or more respective interfaces (e.g., O1 interface, E2 interface, or other interface). The RAN 106, RAN 802, and RAN 804 each can comprise respective groups of cells, which, for reasons or brevity and clarity, are not shown in FIG. 8.

In some embodiments, the RAN 106 can be associated with a first vendor or operator and can utilize a first defined format with regard to configuring the group (e.g., first group) of cells (e.g., cells 112, 114, 116, and/or 118) of the RAN 106 using first reference signal profiles allocated to cells of the first group of cells. The RAN 802 can be associated with a second vendor or operator and can utilize a second defined format with regard to configuring the second group of cells of the RAN 802 using second reference signal profiles allocated to cells of the second group of cells. The RAN 804 can be associated with a third vendor or operator and can utilize a third defined format with regard to configuring the third group of cells of the RAN 804 using the allocated reference signal profiles using third reference signal profiles allocated to cells of the third group of cells.

The adapter component 224 can translate the first profile information (e.g., respective first parameters and/or other respective first profile information) of the respective first reference signal profiles associated with the respective profile index values allocated to the respective cells (e.g., cell 112, cell 114, cell 116, cell 118, and/or other cells) of the first group of cells of the RAN 106, based at least in part on a desired (e.g., suitable, applicable, or optimal) first translation function, to generate respective translated first profile information (e.g., respective translated first parameters and/or other respective first translated profile information) of the respective first reference signal profiles allocated to the respective cells of the RAN 106, in accordance with a desired defined first format (e.g., a desired defined first profile information and/or configuration format) associated with (e.g., applicable to, compatible with, or suitable or optimal for) the RAN 106 and/or the first vendor or operator associated with the RAN 106. The adapter component 224 can translate the second profile information (e.g., respective second parameters and/or other respective second profile information) of the respective second reference signal profiles associated with respective profile index values allocated to respective cells of the second group of cells of the RAN 802, based at least in part on a desired second translation function, to generate respective translated second profile information (e.g., respective translated second parameters and/or other respective second translated profile information) of the respective second reference signal profiles allocated to the respective cells of the RAN 802, in accordance with a desired defined second format associated with (e.g., applicable to, compatible with, or suitable or optimal for) the RAN 802 and/or the second vendor or operator associated with the RAN 802. The adapter component 224 also can translate the third profile information (e.g., respective third parameters and/or other respective third profile information) of the respective third reference signal profiles associated with respective profile index values allocated to respective cells of the third group of cells of the RAN 804, based at least in part on a desired third translation function, to generate respective translated third profile information (e.g., respective translated third parameters and/or other respective third translated profile information) of the respective third reference signal profiles allocated to the respective cells of the RAN 804, in accordance with a desired defined third format associated with (e.g., applicable to, compatible with, or suitable or optimal for) the RAN 804 and/or the third vendor or operator associated with the RAN 804. The respective defined formats can be or can relate to, for example, respective configuration model-specific syntax respectively associated with the RAN 106, RAN 802, and/or RAN 804, and/or respectively associated vendors or operators.

The resource management component 124 (e.g., employing a configuration component 226) can communicate or facilitate communicating the respective translated first profile information to the RAN 106 to facilitate configuration of the first group of cells of the RAN 106 based at least in part on the respective translated first profile information, can communicate or facilitate communicating the respective translated second profile information to the RAN 802 to facilitate configuration of the second group of cells of the RAN 802 based at least in part on the respective translated second profile information, and/or can communicate or facilitate communicating the respective translated third profile information to the RAN 804 to facilitate configuration of the third group of cells of the RAN 804 based at least in part on the respective translated third profile information.

In some embodiments, the resource management component 124 can employ the configuration component 226 (e.g., a configurator) to configure or facilitate configuring the respective cells (e.g., cells 112, 114, 116, and/or 118) of a RAN (e.g., RAN 106) based at least in part on the respective translated profile information (e.g., in the desired defined format) associated with respective reference signal profiles, associated with respective profile index values associated with a profile type, allocated to the respective cells of the RAN. For instance, the configuration component 226 can communicate the respective translated profile information associated with the respective reference signal profiles to the RAN 106, and/or can configure or otherwise facilitate configuring the respective cells (e.g., cells 112, 114, 116, and/or 118) of the RAN 106 based at least in part on the respective translated profile information. The respective parameters associated with the respective resources (e.g., respective parameters relating to ZP reference signal resources, NZP reference signal resources, and/or other resources) and/or respective functions of the respective cells of the RAN 106 can be configured based at least in part on the respective translated profile information (e.g., based at least in part on the use or application of the respective translated profile information on or of the respective cells of the RAN 106).

In some embodiments, the resource management component 124 can employ code that can be same as or similar to the following non-limiting example pseudocode to perform (e.g., automatically perform) profile type selection and profile index (and associated reference signal profile) allocation to cells. The non-limiting example pseudocode can comprise:

```
1) Sort profile type based on resource usage
2) Iterate through each profile type, from low
resource usage profile type up:
3) For each cell in cellist
  if (AssignUniqueProfileIndex(cell) == false) then
      if there is no profile type left, then error
    else select next profile type and go back to #3
  else
    process next cell
```

AssignUniqueProfileIndex(cell) function:

```
1) if cell(profileIndexAlreadyAllocated) == true then
     return true
   else
     Get all neighbor cells' profile index for comparison
     If there is a free profile index left from profile type
        Assign cell to the free profile index, return true
     else return false
```

It is to be appreciated and understood that the above non-limiting example pseudocode is but one example of pseudocode and associated operations and processes that can be performed by the resource management component 124 to perform profile type selection and profile index allocation to cells. In other embodiments, the resource management component 124 can employ other code and associated operations and processes, which can be performed by the resource management component 124 to perform profile type selection and profile index allocation to cells, including the operations, processes, and techniques described herein.

There can be instances where there can be changes (e.g., permanent changes or temporary changes) to one or more cells of the group of cells (e.g., cells 112, 114, 116, and/or 118) of the RAN 106. For instance, a cell may be added to or removed from the group of cells of the RAN 106, or there can be modifications made to a cell of the RAN 106 (e.g., a cell can be modified such that the cell coverage area of the cell can be changed), or a cell of the RAN 106 can be out of service (e.g., temporarily out of service). In accordance with various embodiments, the resource management component 124 can detect or identify, or can receive information indicating, that there has been a change with regard to the group of cells of the RAN 106. In some embodiments, the cell topology component 214 and/or the RAN 106 (e.g., the RAN 106, base station(s), or the cells of the RAN 106 employing the neighbor relation component 216) can employ the ANR function or other automated cell relation detection and identification function or tool that can determine or detect (e.g., automatically determine or detect) any changes with regard to one or more cells of the RAN 106 and relationships (e.g., locational, spatial, physical, and/or logical relationships), including any changes in relationships, between cells, including neighbor cells (e.g., cells neighboring or adjacent cells) that neighbor or are adjacent to a cell of the RAN 106, such as described herein. In other embodiments, the user can detect, can be aware, or can be made aware, of any changes to one or more cells of the group of cells (e.g., cells 112, 114, 116, and/or 118) of the RAN 106, such as described herein.

Based at least in part on the detected changes with regard to one or more cells of the RAN 106, the cell topology component 214 and/or the neighbor relation component 216 can update (e.g., automatically or dynamically update or modify) neighbor relations information, comprising respective cell identification information and/or respective cell location information, in a table(s), a list(s), or in another informational form, and can store the updated neighbor relations information in a data store.

The cell topology component 214 can analyze updated cell-related information, including the updated neighbor relations information, relating to the changes with regard to the one or more cells of the RAN 106. Based at least in part on the results of such analysis, the cell topology component 214 can determine, generate, or update (e.g., automatically or dynamically determine, generate, or update) the cell relation topology information (e.g., to generate updated cell relation topology information) that can indicate, specify, or identify (e.g., automatically or dynamically indicate, specify, or identify) the changes to the respective cells, the respective locations of the respective cells, and/or the respective relationships (e.g., locational, spatial, physical, and/or logical relationships) between the respective cells associated with the RAN 106.

In some embodiments, the profile type determination component 220 can analyze the updated cell relation topology information and the respective groups of reference signal profiles associated with respective profile types, to facilitate re-evaluating whether the current profile type selection and associated profile index value and associated reference signal profile allocation can still be suitable or whether there is to be a change in the profile type, and/or even whether the change in cell topology can allow a profile type selection that can reduce resource usage as compared to the amount of resource usage associated with the current profile type selected. For instance, based at least in part on the results of such analysis, the profile type determination component 220 can determine and select (e.g., automatically or dynamically determine and select) a desirable (e.g., suitable, usable, or optimal) profile type, from the group of profile types, that can achieve and maintain the desired (e.g., wanted, required, suitable, or optimal) orthogonality between adjacent cells (e.g., cell 112, cell 114, and cell 116) of the respective cells of the RAN 106 (e.g., the desired orthogonality between respective ZP reference signal resources of the respective adjacent cells), while reducing or minimizing the amount of resource usage (e.g., the amount or level of usage of resources, such as ZP reference signal resources, NZP reference signal resources, and/or other type of resources), in accordance with the defined resource management criteria, such as described herein.

As some non-limiting examples, if the same profile type selection continues to be suitable (and resource usage cannot be further reduced as a result of the cell topology change), the profile type determination component 220 can continue to utilize the same profile type (e.g., the lower resource profile type, the higher resource profile type, or another profile type), and the allocator component 222 can perform any modifications to allocations of profile index values and associated reference signal profiles to account for the change in cell topology (e.g., can assign a suitable profile index value and associated reference signal profile to a new cell added to the RAN). In some embodiments, if, instead, the lower resource profile type was being utilized for the cells of the RAN 106, and based at least in part on the analysis results indicating the modification made with regard to the cells of the RAN 106, the profile type determination component 220 determines that the profile index values and associated reference signal profiles associated with the lower resource profile type are not able to ensure orthogonality between adjacent cells of the RAN 106 (e.g., due to the modification to the cells of the RAN), the profile type determination component 220 can determine that a higher resource profile type (e.g., a next higher or other higher resource profile type) can be utilized to ensure orthogonality between the adjacent cells, and the allocator component 222 can modify the reference signal profile allocation of the cells by allocating respective profile index values and associated respective reference signal profiles associated with the higher resource profile type to the respective cells of the RAN 106. In certain embodiments, if, instead, the higher resource profile type was being utilized for the cells of the RAN 106, and based at least in part on the analysis results indicating the modification made with regard to the cells of the RAN 106, the profile type determination component 220 determines that the profile index values and associated reference signal profiles associated with the lower resource profile type can ensure orthogonality between adjacent cells of the RAN 106 (e.g., due to the modification to the cells of the RAN), the profile type determination component 220 can determine that the lower resource profile type can be utilized and selected to ensure orthogonality between the adjacent cells, and the allocator component 222 can modify the reference signal profile allocation of the cells by allocating respective profile index values and associated respective reference signal profiles associated with the lower resource profile type to the respective cells of the RAN 106, which can reduce the amount of resource usage, as compared to if the higher resource profile type had continued to be used.

In other embodiments, if, instead, the previous profile type selection includes, for example, a higher resource profile type, along with the lower resource profile type, and the profile type determination component 220 and/or allocator component 222 determines that, due to the change in cell topology, more cells of the RAN 106 can be assigned a profile index value associated with the lower resource profile type, the profile type determination component 220 can continue to utilize the same profile types, although the allocator component 222 can perform any modifications to allocations of profile index values and associated reference signal profiles to account for the change in cell topology, which can include assigning more profile index values and associated reference signal profiles associated with the lower resource profile type to more of the cells of the RAN 106 as can be suitable (e.g., to reduce resource usage), while ensuring orthogonality between adjacent cells. In still other embodiments, if, instead, the previous profile type(s) selection includes the lower resource profile type, and the profile type determination component 220 and/or allocator component 222 determines that, due to the change in cell topology, it can be desirable (e.g., suitable, wanted, or required) to have at least some of cells of the RAN 106 be assigned a profile index value(s) (and associated reference signal profile(s)) associated with a higher resource profile type, the profile type determination component 220 can select (e.g., automatically select) the higher resource profile type for such cell(s) (along with the lower resource profile type for the other cells that still can have profile index values associated with the lower resource profile type), and the allocator component 222 can perform any modifications to allocations of profile index values and associated reference signal profiles to account for the change in cell topology, which can include assigning at least some profile index values and associated reference signal profiles associated with the higher resource profile type to at least some of the cells of the RAN 106 as can be suitable, while maintaining assignment of (or re-assigning) profile index values associated with the lower resource profile type to the other cells of the RAN 106 (e.g., to reduce resource usage), all while ensuring orthogonality between adjacent cells.

In yet other embodiments, if desired, the profile type determination component 220 can allow the user (e.g., operator, expert, or other user) to determine and/or select the desirable profile type, from the group of profile types, based at least in part on an analysis of the updated cell relation topology information and the respective groups of reference signal profiles associated with the respective profile types, such as described herein.

Based at least in part on the updated cell relation topology information and the respective groups of reference signal profiles associated with the profile type determined and/or selected, the profile type determination component 220 and/or the allocator component 222 can determine respective allocations (e.g., determine updates to the allocations) of respective profile index values and associated respective reference signal profiles associated with the profile type to the respective cells (e.g., cell 112, cell 114, cell 116, cell 118, and/or other cell) of the RAN 106, such as described herein. Based at least in part on the determined allocations, the allocator component 222 can allocate (e.g., automatically or dynamically allocate or assign, or update the allocation or assignment) the respective profile index values and associated respective reference signal profiles associated with the profile type to the respective cells of the RAN 106, such as described herein. For instance, the allocator component 222 can determine and/or update allocations with regard to any cell for which an allocation of a reference signal profile and associated profile index value has changed or is new.

With regard to the updated allocation, the adapter component 224 can translate the respective profile information (e.g., respective parameters and/or other respective profile information) of the respective reference signal profiles associated with the one or more respective profile index values allocated to the respective cells (e.g., cell 112, cell 114, cell 116, cell 118, and/or other cells) of the RAN 106, based at least in part on the desired (e.g., suitable, applicable, or optimal) translation function, to generate the respective translated profile information of the respective reference signal profiles associated with the respective profile index values allocated to the respective cells of the RAN 106, in accordance with the desired defined format associated with (e.g., applicable to, compatible with, or suitable or optimal for) the RAN 106 (and/or the vendor or operator associated therewith), such as described herein. For instance, the adapter component 224 can translate any profile information of any reference signal profile with regard to any cell for which a new or different reference signal profile and associated profile index value has been allocated, to account for the changes to the group of cells of the RAN 106.

The configuration component 226 can communicate or facilitate communicating the respective translated profile information of the respective reference signal profiles to the RAN 106 to facilitate configuration of any of the cells (e.g., cell 112, cell 114, cell 116, cell 118, or other cell) of the RAN 106 that is to be configured or reconfigured to facilitate configuration or reconfiguration of those cells of the RAN 106 based at least in part on the respective translated profile information, such as described herein. For instance, the configuration component 226 can communicate the respective translated profile information associated with the respective reference signal profiles to the RAN 106, and/or can configure or otherwise facilitate configuring any of the cells of the RAN 106 that is to be configured or reconfigured based at least in part on the respective translated profile information.

In accordance with various embodiments, the resource management component 124 can comprise or be associated with a processor component 228. The processor component 228 can be associated with (e.g., communicatively connected to) and can work in conjunction with the other components (e.g., the profile component 210, profile grouper component 212, cell topology component 214, profile type determination component 220, allocator component 222, adapter component 224, configuration component 226, data store 230, and/or other component) to facilitate performing the various functions and operations of the resource management component 124. The processor component 228 can employ one or more processors (e.g., one or more central processing units (CPUs)), microprocessors, or controllers that can process information relating to data, files, services, applications, communication networks, RANs, cells, resources, reference signal profiles, profile types, profile index numbers, machine learning models, training data, feedback information, data processing operations, messages, notifications, alarms, alerts, preferences (e.g., user or client preferences), hash values, metadata, parameters, traffic flows, policies, defined resource management criteria, algorithms (e.g., enhanced resource management algorithms, profile grouping algorithms, allocation algorithms, hash algorithms, data compression algorithms, data decompression algorithms, and/or other algorithm), interfaces, protocols, tools, and/or other information, to facilitate operation of the resource management component 124, and control data flow between the resource management component 124 and/or other components (e.g., network components, RANs (e.g., RAN 106), the communication network 102, a device (e.g., 218), a node, a service, a user, or other entity) associated with the resource management component 124.

The resource management component 124 also can comprise or be associated with a data store 230 can store data structures (e.g., user data, metadata), code structure(s) (e.g., modules, objects, hashes, classes, procedures) or instructions, information relating to data, files, services, applications, communication networks, RANs, cells, resources, reference signal profiles, profile types, profile index numbers, machine learning models, training data, feedback information, data processing operations, messages, notifications, alarms, alerts, preferences (e.g., user or client preferences), hash values, metadata, parameters, traffic flows, policies, defined resource management criteria, algorithms (e.g., enhanced resource management algorithms, profile grouping algorithms, allocation algorithms, hash algorithms, data compression algorithms, data decompression algorithms, and/or other algorithm), interfaces, protocols, tools, and/or other information, to facilitate controlling or performing operations associated with the resource management component 124. The data store 230 can comprise volatile and/or non-volatile memory, such as described herein. In an aspect, the processor component 228 can be functionally coupled (e.g., through a memory bus) to the data store 230 in order to store and retrieve information desired to operate and/or confer functionality, at least in part, to the profile component 210, profile grouper component 212, cell topology component 214, profile type determination component 220, allocator component 222, adapter component 224, configuration component 226, processor component 228, data store 230, and/or other component of the resource management component 124, and/or substantially any other operational aspects of resource management component 124.

As disclosed, the data store 230 can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), flash memory, non-volatile memory express (NVMe), NVMe over fabric (NVMe-oF), persistent memory (PMEM), or PMEM-oF. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

With further regard to the O-RAN architecture and environment, in some embodiments, the RAN 106 can comprise various RAN nodes, including distributed units (DUs) associated with cells (e.g., DU 232 associated with cell 112, DU 234 associated with cell 114, DU 236 associated with cell 116, DU 238 associated with cell 118, and/or another DU of another cell (not shown in FIG. 2)), one or more central units (CUs) 240 associated with (e.g., communicatively connected to) the respective DUs, and/or one or more radio units (RUs) 242 associated with the CU(s) 240, and/or other components. In some embodiments, a base station(s) (e.g., base stations 108 and/or 110) of the RAN 106, which also can be referred to as a gNodeB (gNB), can be logically divided into several components, which can allow for flexibility of deployment. For instance, the base station (e.g., base station 108 or 110) can comprise a DU(s) (e.g., 232, 234, 236, or 238), which also can be referred to as gNB-DU. A DU, such as, for example, the DU 232, can be a logical node that can host or handle baseband (e.g., physical (PHY) 244) and layer 2 (L2) (e.g., medium access control (MAC) layer 246 and radio link control (RLC) layer 248) functionality associated with the base station. The DUs 234, 236, and/or 238 also can comprise respective PHY, MAC, and RLC layers. The base station (e.g., base station 108 or 110) also can comprise the CU 240, which can include a CU-control plane (CP) that also can be referred to as gNB-CU-CP. The CU-CP (also referred to as a CU-CP node) can be a logical node that can host or handle layer 3 (L3) (e.g., radio resource control (RRC) and packet data convergence protocol (PDCP) layer) control plane functionality associated with the base station. The CU 240 also can comprise a CU-UP, which also can be referred to as gNB-CU-UP. The CU-UP (also referred to as a CU-UP node) can be a logical node that can host or handle data traffic between the core network 104 (e.g., 5G core network) and the DUs (e.g., 232, 234, 236, and/or 238) to which the CU-UP is connected. The RU 242 (e.g., O-RAN RU) can be or can comprise a logical node that can host a lower PHY layer and radio frequency (RF) processing, where signals (e.g., RF signals) can be transmitted, received, amplified, digitized, or otherwise processed, to facilitate communication of information (e.g., signals comprising information) between the RAN 106 and other devices (e.g., device 218) or components (e.g., components or functions of the core network 104 or communication network 102).

In some embodiments, the SMO component 202 can communicate with the controller component 204 and/or RAN 106 (e.g., transmit information to or receive information from the controller component 204 and/or RAN 106) via an interface, such as an O1 interface 206 (and/or the A1 interface). The controller component 204 can communicate with the RAN 106 (e.g., transmit information to or receive information from RAN or E2 nodes of the RAN 106) via an interface, such as the E2 interface 208. In accordance with various embodiments, the SMO component 202, the controller component 204, and/or the resource management component 124 can utilize one or more applications (e.g., one or more xApps, rApps, or other type of applications) that can perform one or more of the respective functions of the SMO component 202, the controller component 204, and/or the resource management component 124.

At various times, one or more devices (e.g., UEs), such as device 218 can be connected (e.g., wirelessly connected) to the RAN 106 via the respective cells (e.g., cells 112, 114,

116, or 118) of the RAN 106. For instance, one or more respective devices (e.g., device 218) can be associated with (e.g., communicatively connected to) one or more respective DUs (e.g., DUs 232, 234, 236, or 238) associated with one or more respective cells (e.g., cells 112, 114, 116, or 118) to facilitate communicating data traffic to the core network 104 and/or another communication device associated with the core network 104 or other associated communication network.

The SMO component 202 can act and operate as a management and orchestration layer that can control configuration and automation aspects of the controller component 204 and RAN elements of the RAN 106. The SMO component 202 can comprise various types of management services and various network functions, comprising network management functions, which can include RAN-type or RAN-related functions, core management functions, transport management functions, network slice management functions (e.g., end-to-end network slice management functions), and/or other network management functions. In accordance with various embodiments, the network functions can be or can comprise physical network functions, virtualized network functions (e.g., virtual machines (VMs), containers, or other virtualized network functions). At least some of the various network functions (e.g., network management functions or other network functions) can operate in real time or near real time. The controller component 204 (e.g., RIC) can operate to control (e.g., manage) and enhance (e.g., improve or optimize) RAN functions and services of the RAN 106. At least some of the various network functions and components of the controller component 204 can operate in real time or near real time, and some network functions and components of the controller component 204 may operate in non-real time.

In accordance with some embodiments, the resource management component 124 can comprise or be associated with an artificial intelligence (AI) component 250 that can employ AI, machine learning, and/or other AI-type techniques and algorithms to determine or generate reference signal profiles, group respective reference signal profiles into respective groups of reference signal profiles associated with respective profile types, determine respective relationships between respective cells of a RAN or the communication network, determine a profile type(s), from the group of profile types, to utilize for allocation of respective reference signal profiles to respective cells of the RAN, determine allocation of respective reference signal profiles to respective cells of the RAN, and/or perform other desired functions or operations. In some embodiments, the AI component 250 can comprise, generate, and/or train machine learning models that can be trained to determine or generate reference signal profiles, group respective reference signal profiles into respective groups of reference signal profiles associated with respective profile types, determine respective relationships between respective cells of the RAN or the communication network, determine a profile type(s), from the group of profile types, to utilize for allocation of respective reference signal profiles to respective cells of the RAN, determine allocation of respective reference signal profiles to respective cells of the RAN, and/or perform other desired functions or operations.

For instance, the AI component 250 can employ a trainer component 252 that can train (or refine or update training of) a (trained) machine learning model to learn to determine or generate reference signal profiles, group respective reference signal profiles into respective groups of reference signal profiles associated with respective profile types, determine respective relationships between respective cells of the RAN or the communication network, determine a profile type(s), from the group of profile types, to utilize for allocation of respective reference signal profiles to respective cells of the RAN, determine allocation of respective reference signal profiles to respective cells of the RAN, and/or perform other desired functions or operations, based at least in part on application of training data and/or feedback information relating to resources, reference signal profiles, characteristics, and cells to the (trained) machine learning model. Such training of the trained machine learning model can enable the trained machine learning model to learn to identify respective (e.g., different types of) data patterns in data (e.g., profile information, resource-related information, characteristics, cell-related information, cell relation topology information, and/or the other desired information) being analyzed by the trained machine learning model and distinguish between data patterns in the data (if any) that can indicate, for example, desirable (e.g., suitable, wanted, enhanced, or optimal) generation of reference signal profiles, grouping of respective reference signal profiles into respective groups of reference signal profiles associated with respective profile types, determinations relating to respective relationships between respective cells of the RAN or the communication network, determinations regarding selection of a profile type(s), from the group of profile types, to utilize for allocation of respective reference signal profiles to respective cells of the RAN, or allocations of respective reference signal profiles to respective cells of the RAN.

In certain embodiments, the trained machine learning model can perform a machine learning-based analysis on information relating to resources, cells, reference signal profiles, the defined resource management criteria, and/or the other desired information. Based at least in part on the results of the machine learning-based analysis on such information, the trained machine learning model can determine or infer respective profile information to include in respective reference signal profiles, determine or infer respective reference signal profiles that can be grouped to form respective groups of reference signal profiles associated with respective profile types, determine or infer respective relationships between respective cells of the RAN or the communication network, determine or infer a profile type(s), from the group of profile types, to utilize for allocation of respective reference signal profiles to respective cells of the RAN, determine or infer allocation of respective reference signal profiles to respective cells of the RAN, and/or perform other desired functions or operations. For example, based at least in part on the machine learning-based analysis results, the trained machine learning model can determine whether there are one or more data patterns in the data that can indicate respective reference signal profiles that can be grouped to form respective groups of reference signal profiles associated with respective profile types, or can indicate respective relationships between respective cells of the RAN or the communication network. In some embodiments, the trained machine learning model can determine a probability (e.g., probability value) that selection of a particular profile type associated with a group of reference signal profiles is desirable (e.g., suitable, usable, or optimal) to achieve or ensure desired orthogonality between respective adjacent cells of the RAN. The resource management component 124, AI component 250, or the trained machine learning model can determine whether the selection of the particular profile type associated with the group of reference signal profiles is desirable to achieve or ensure desired orthogonality between respective adjacent cells of the RAN based at least in part on the probability and a defined threshold probability (e.g., a defined threshold probability value) relating to profile type selection and/or allocation of reference signal profiles to cells, and/or based at least in part on whether there are one or more data patterns in the data that can indicate whether the selection of the particular profile type associated with the group of reference signal profiles is desirable to achieve or ensure desired orthogonality between respective adjacent cells of the RAN.

For instance, the resource management component 124, the AI component 250, or the trained machine learning model can compare the probability to the defined threshold probability to determine whether the probability satisfies (e.g., meets or exceeds; is at or greater than) the defined threshold probability. If, based at least in part on the results of such comparison, the resource management component 124, the AI component 250, or the trained machine learning model determines that the probability does not satisfy (e.g., is less than) the defined threshold probability, the resource management component 124, the AI component 250, or the trained machine learning model can determine that the selection of the particular profile type associated with the group of reference signal profiles is not desirable (e.g., not suitable, usable, or optimal) to achieve or ensure desired orthogonality between respective adjacent cells of the RAN. If, instead, based at least in part on the comparison results, the resource management component 124, the AI component 250, or the trained machine learning model determines that the probability does satisfy the defined threshold probability, the resource management component 124, the AI component 250, or the trained machine learning model can determine that the selection of the particular profile type associated with the group of reference signal profiles can be desirable to achieve or ensure desired orthogonality between respective adjacent cells of the RAN.

With further regard to the AI component 250, the AI component 250 can perform an AI and/or machine learning-based analysis on data, such as information relating to communication networks, RANs, cells, relationships between cells, resources, reference signal profiles, resource or reference signal profile allocation to cells, configuration of cells, training data, feedback information, files, services, applications, messages, notifications, alarms, alerts, preferences (e.g., user or client preferences), hash values, metadata, parameters, traffic flows, policies, defined resource management criteria, protocols, tools, and/or other information, such as more fully described herein. In connection with or as part of such an AI or machine learning-based analysis, the AI component 250 can employ, build (e.g., construct or create), and/or import, AI and/or machine learning techniques and algorithms, AI and/or machine learning models (e.g., trained models), neural networks (e.g., trained neural networks), Markov chains (e.g., trained Markov chains), and/or graph mining to render and/or generate predictions, inferences, calculations, prognostications, estimates, derivations, forecasts, detections, and/or computations that can facilitate determining or learning data patterns in data, determining or learning a correlation, relationship, or causation between an item(s) of data and another item(s) of data (e.g., occurrence of the other item(s) of data or an event relating thereto), determining or learning a correlation, relationship, or causation between an event and another event (e.g., occurrence of another event), determining or learning about relationships between components (e.g., base stations, cells, network nodes, communication links, devices, or other components or functions) of or associated with the communication network 102, determining or learning about resources, determining or learning about profile information relating to resources that can be included in reference signal profiles, determining or learning desirable structuring or formatting of reference signal profiles, determining or learning characteristics and features relating to reference signal profiles, determining or learning desirable grouping of respective reference signal profiles into respective groups based on respective characteristics associated with the respective reference signal profiles, determining or learning about respective relationships between respective cells of a RAN or communication network, determining or learning about selection of a profile type(s) that can be utilized for allocation of respective reference signal profiles to respective cells of the RAN, determine or learning desirable allocation of respective reference signal profiles to respective cells of the RAN, and/or perform other desired functions or operations and/or automating one or more functions or features of the disclosed subject matter, as more fully described herein.

Based at least in part on the results of the analysis, the AI component 250 can determine, train, and generate one or more models (e.g., machine learning model or other model), such as described herein, wherein the models can model or be representative of respective features and/or respective historical performance of the communication network, RAN, cells, determination of reference signal profiles, grouping of reference signal profiles, determining respective relationships between respective cells, allocation of resources or reference signal profiles to cells, and/or other functions, features, or operations, such as described herein. The AI component 250 can update (e.g., modify, adjust, refine, or change), and further train and enhance, the model as additional data (e.g., information relating to further operation of the communication network, cells, modifications to cells, allocation of resources or reference signal profiles to cells, configuration of cells, output results output from the machine learning model, the feedback information, and/or other information) is received and analyzed by the AI component 250 or model. In some embodiments, as part of the data analysis, and the determining and training of the models, the AI component 250 can employ (and/or train) Markov chains, a neural network(s), or other AI-based or machine learning-based modeling, techniques, functions, or algorithms.

The AI component 250 can employ various AI-based or machine learning-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component 250 can examine the entirety or a subset of the data (e.g., the training data, the feedback information, other information, such as described herein) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, z=(z1, z2, z3, z4, . . . , zn), to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Figure 9:
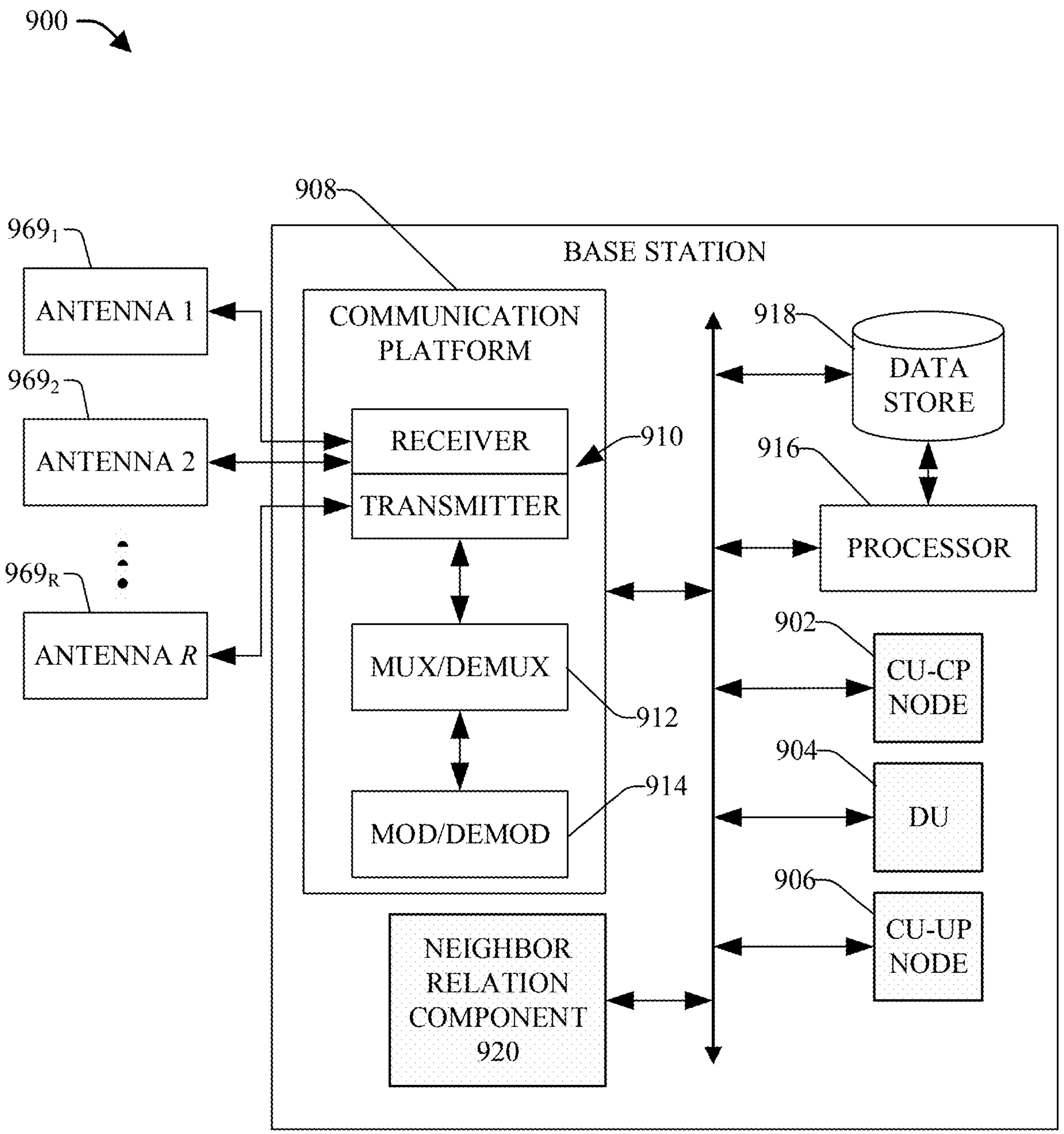
FIG. 9 depicts a diagram of a non-limiting example base station that can desirably facilitate connections and communication of information associated with devices, in accordance with various aspects and embodiments of the disclosed subject matter.

Turning to FIG. 9, FIG. 9 depicts a diagram of a non-limiting example base station 900 that can desirably facilitate (e.g., enable) connections (e.g., wireless connections) and communication of information associated with devices, in accordance with various aspects and embodiments of the disclosed subject matter. In some embodiments, the base station 900 can be a 5G or other NR base station (e.g., gNB or other NR-type or xG base station, wherein x can be a number greater than 5). In other embodiments, the base station 900 can be a 4G or LTE base station, or some other type of base station (e.g., other type of access point).

With regard to a 5G or other NR base station, the base station 900 can comprise a CU-CP node 902 (e.g., a gNB or other NR-NB CU-CP node), one or more DUs (e.g., a gNB or other NR-NB DUs), including DU 904, a desired number of CU-UP nodes (e.g., a gNB or other NR-NB CU-UP nodes), including CU-UP node 906, and/or other network equipment. The CU-CP node 902 can be associated or interfaced with the DUs (e.g., DU 904) via an interface (e.g., F1-C interface) or connection. The CU-CP node 902 can be associated or interfaced with the CU-UP nodes (e.g., CU-UP node 906) via an interface (e.g., E1 interface) or connection. The one or more CU-UP nodes (e.g., CU-UP node 906) can be associated or interfaced with the one or more DUs (e.g., DU 904) via an interface (e.g., F1-U interface) or connection.

A DU (e.g., DU 904) can provide support for lower layers of a protocol stack. For instance, a DU (e.g., DU 904) can be a logical node that can host or handle baseband (e.g., PHY) and L2 (e.g., MAC and RLC layer) functionality associated with the base station 900. A CU-UP node (e.g., CU-UP node 906) can be a logical node that can host or handle data traffic between the core network 104 (e.g., 5G or other NR or xG core network) and the DU(s) (e.g., DU 904) to which the particular CU-UP is connected. The CU-CP node 902 can be a logical node that can host or handle L3 (e.g., RRC and packet data convergence protocol (PDCP) layer) control plane functionality associated with the base station 900.

In some embodiments, a device(s) (e.g., device(s) 218) can be connected to the base station 900, via the DU 904, wherein the CU-UP node 906 and the DU 904 can be serving the device by performing or facilitating performing downlink data transfers of downlink data to the device from a data source (e.g., a service and/or another device, or a network component of the communication network 102 or core network 104 (e.g., via the UPF node)), and uplink data transfers of uplink data from the device to a desired destination (e.g., the data source) via the base station 900.

The base station 900 can receive and transmit signal(s) from and to wireless devices like access points (e.g., base stations, femtocells, picocells, or other type of access point), access terminals (e.g., UEs), wireless ports and routers, and the like, through a set of antennas $\mathbf{969}_1$-$\mathbf{969}_R$. In an aspect, the antennas $\mathbf{969}_1$-$\mathbf{969}_R$ can be a part of a communication platform 908, which comprises electronic components and associated circuitry that can provide for processing and manipulation of received signal(s) and signal(s) to be transmitted. In an aspect, the communication platform 908 can include a receiver/transmitter 910 that can convert signal from analog to digital upon reception, and from digital to analog upon transmission. In addition, receiver/transmitter 910 can divide a single data stream into multiple, parallel data streams, or perform the reciprocal operation. In accordance with various embodiments, the communication platform 908 can be, can comprise, or can be associated with an RU (e.g., a gNB or other NR-NB RU node).

In an aspect, coupled to receiver/transmitter 910 can be a multiplexer/demultiplexer (mux/demux) 912 that can facilitate manipulation of signal in time and frequency space. The mux/demux 912 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 912 can scramble and spread information (e.g., codes) according to substantially any code known in the art, e.g., Hadamard-Walsh codes, Baker codes, Kasami codes, polyphase codes, and so on. A modulator/demodulator (mod/demod) 914 also can be part of the communication platform 908, and can modulate information according to multiple modulation techniques, such as frequency modulation, amplitude modulation (e.g., M-ary quadrature amplitude modulation (QAM), with M a positive integer), phase-shift keying (PSK), and the like.

The base station 900 also can comprise a processor(s) 916 that can be configured to confer and/or facilitate providing functionality, at least partially, to substantially any electronic component in or associated with the base station 900. For instance, the processor(s) 916 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, and/or other operations on data.

In another aspect, the base station 900 can include a data store 918 that can store data structures; code instructions; rate coding information; information relating to measurement of radio link quality or reception of information related thereto; information relating to devices, communication conditions or performance indicators associated with devices (e.g., signal-to-interference-plus-noise ratio (SINR), reference signal received power (RSRP), reference signal received quality (RSRQ), channel quality indicator (CQI), and/or other wireless communications metrics or parameters) associated with devices, metadata, policies and rules, users, applications, services, resource management criteria, traffic flows, signaling, algorithms (e.g., resource management algorithm(s), uplink grant scheduling algorithm(s), downlink scheduling algorithm(s), or other algorithm(s)), protocols, interfaces, tools, and/or other information; white list information, information relating to managing or maintaining the white list; system or device information like policies and specifications; code sequences for scrambling; spreading and pilot transmission; floor plan configuration; base station deployment and frequency plans; scheduling policies; and so on. The processor(s) 916 can employ one or more processors (e.g., one or more CPUs), microprocessors, or controllers) that can process information, and can be coupled to the data store 918 in order to store and retrieve at least some of the information (e.g., information, such as algorithms, relating to multiplexing/demultiplexing or modulation/demodulation; information relating to radio link levels; information relating to devices, communication conditions associated with devices, metadata, communication devices, policies and rules, users, applications, services, resource management criteria, traffic flows, signaling, algorithms (e.g., resource management algorithm(s), uplink grant scheduling algorithm(s), downlink scheduling algorithm(s), or other algorithm(s)), protocols, interfaces, tools, and/or other information) desired to operate and/or confer functionality to the communication platform 908 and/or other operational components of the base station 900.

The data store 918 can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), flash memory, non-volatile memory express (NVMe), NVMe over fabric (NVMe-oF), persistent memory (PMEM), or PMEM-oF. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Memory of the disclosed aspects are intended to comprise, without being limited to, these and other suitable types of memory.

In accordance with various embodiments, the base station 900 can comprise or be associated with a neighbor relation component 920 that can detect or identify (e.g., automatically or dynamically detect or identify) cells (e.g., adjacent or neighboring cells) and/or detect, determine, or obtain (e.g., automatically or dynamically detect, determine, or obtain) information (e.g., cell-related information) indicating relationships between cells (e.g., locational, spatial, logical, and/or physical relationships) between cells of the communication network, such as described herein. In some embodiments, the neighbor relation component 920 can employ the ANR or other desired neighbor cell relationship determination or identification function or tool to obtain or generate the cell-related information relating to the cells and the respective relationships between cells, such as described herein. The neighbor relation component 920 (or another component of or associated with the RAN) can communicate the cell-related information or other desired information to the resource management component (e.g., 124) for analysis and other processing by the resource management component, such as described herein.

Figure 10:
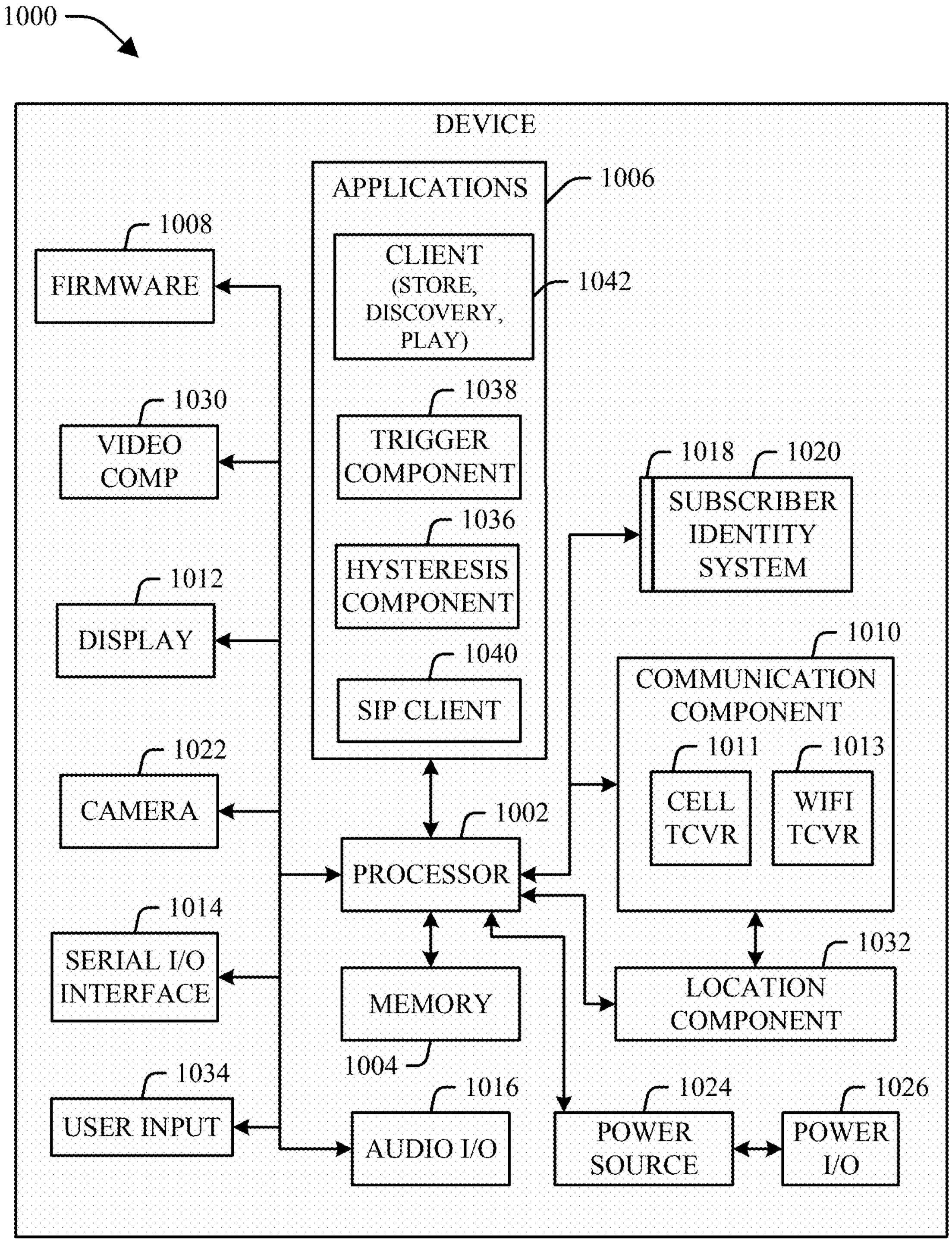
FIG. 10 illustrates a diagram of a non-limiting example device that can be operable to engage in a system architecture that facilitates wireless communications according to one or more embodiments described herein, in accordance with various aspects and embodiments of the disclosed subject matter.

Referring to FIG. 10, FIG. 10 illustrates a diagram of a non-limiting example device 1000 (e.g., wireless or mobile phone, electronic pad or tablet, electronic eyewear, electronic watch, other electronic bodywear, IoT device, or other type of communication device or UE) that can be operable to engage in a system architecture that facilitates wireless communications according to one or more embodiments described herein, in accordance with various aspects and embodiments of the disclosed subject matter. Although a device is illustrated herein, it will be understood that other devices can be a communication device, and that the device 1000 is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device, such as the device 1000, can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of the any of the above should also be included within the scope of computer-readable media.

The device 1000 can include a processor(s) 1002 for controlling and processing all onboard operations and functions. The processor(s) 1002 can comprise one or more processors (e.g., one or more central processing units (CPUs)), microprocessors, or controllers) that can process information associated with the device 1000. A memory 1004 can interface to the processor(s) 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor(s) 1002 from either or both the memory 1004 or/and the firmware 1008. The firmware 1008 can also store startup code for execution in initializing the device 1000. A communication component 1010 interfaces to the processor(s) 1002 to facilitate wired/wireless communication with external systems, e.g., cellular networks, VoIP networks, and so on. Here, the communication component 1010 can also include a suitable cellular transceiver 1011 (e.g., a global system for mobile communication (GSM), orthogonal frequency division multiple access (OFDMA), 4G, LTE, 5G, other NR, or other type of transceiver) and/or an unlicensed transceiver 1013 (e.g., Wi-Fi, WiMax) for corresponding signal communications. The device 1000 can be a device such as a cellular telephone, a PDA with mobile communications capabilities, and messaging-centric devices. The communication component 1010 also facilitates communications reception from terrestrial radio networks (e.g., broadcast), digital satellite radio networks, and Internet-based radio services networks.

The device 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor(s) 1002 to facilitate wired and/or wireless serial communications (e.g., USB, and/or IEEE 1394) through a hardwire connection, and other serial input devices (e.g., a keyboard, keypad, and mouse). This supports updating and troubleshooting the device 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The device 1000 can include a slot interface 1018 for accommodating a SIC (Subscriber Identity Component) in the form factor of a card Subscriber Identity Module (SIM) or universal SIM 1020, and interfacing the SIM card 1020 with the processor(s) 1002. However, it is to be appreciated that the SIM card 1020 can be manufactured into the device 1000, and updated by downloading data and software.

The device 1000 can process IP data traffic through the communication component 1010 to accommodate IP traffic from an IP network such as, for example, the Internet, a corporate intranet, a home network, a person area network, etc., through an ISP or broadband cable provider. Thus, VoIP traffic can be utilized by the device 1000 and IP-based multimedia content can be received in either an encoded or a decoded format.

A video processing component 1022 (e.g., a camera) can be provided for decoding encoded multimedia content. The video processing component 1022 can aid in facilitating the generation, editing, and sharing of video quotes. The device 1000 also includes a power source 1024 in the form of batteries and/or an AC power subsystem, which power source 1024 can interface to an external power system or charging equipment (not shown) by a power I/O component 1026.

The device 1000 can also include a video component 1030 for processing video content received and for recording and transmitting video content. For example, the video component 1030 can facilitate the generation, editing and sharing of video quotes. A location tracking component 1032 facilitates geographically locating the device 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the device 1000 to support SIP protocols and register the subscriber with the SIP registrar server. The applications 1006 can also include a client 1042 that provides at least the capability of discovery, play and store of multimedia content, for example, music.

The device 1000, as indicated above related to the communication component 1010, includes an indoor network radio transceiver 1013 (e.g., Wi-Fi transceiver). This function supports the indoor radio link, such as IEEE 802.11, for the dual-mode GSM device (e.g., device 1000). The device 1000 can accommodate at least satellite radio services through a device (e.g., handset device) that can combine wireless voice and digital radio chipsets into a single device (e.g., single handheld device).

It is to be appreciated and understood that one or more components (e.g., the devices, resource management component, base station, core network, or other component) of the systems (e.g., system 100, system 200, or other system) or methods described herein can comprise or be associated with various other types of components, such as display screens (e.g., touch screen displays or non-touch screen displays), audio functions (e.g., amplifiers, speakers, or audio interfaces), or other interfaces, to facilitate presentation of information to users, entities, or other components (e.g., other devices or other servers), and/or to perform other desired functions or operations.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 11:
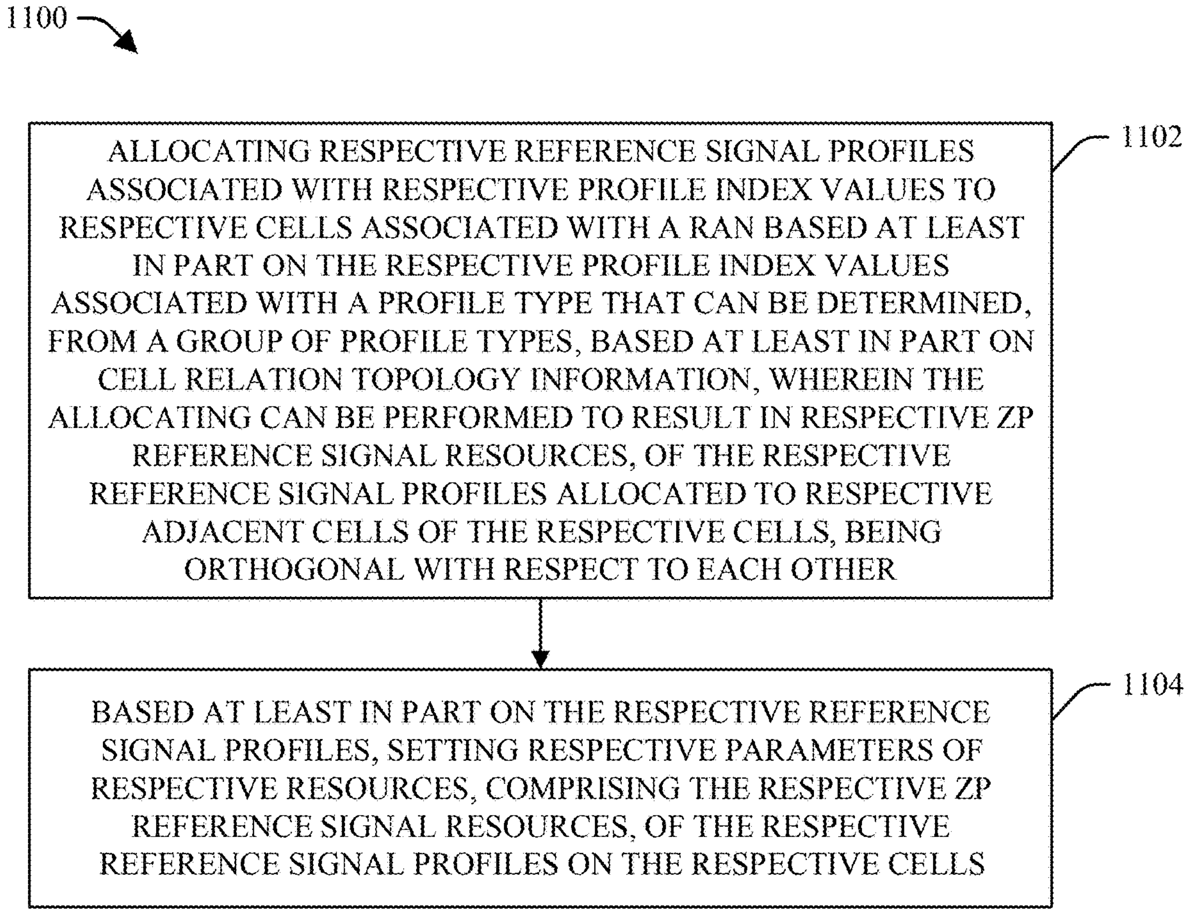
FIG. 11 illustrates a flow chart of an example method that can desirably allocate and/or configure resources, including reference signal resources, on cells of a RAN of a communication network, in accordance with various aspects and embodiments of the disclosed subject matter.
Figure 12:
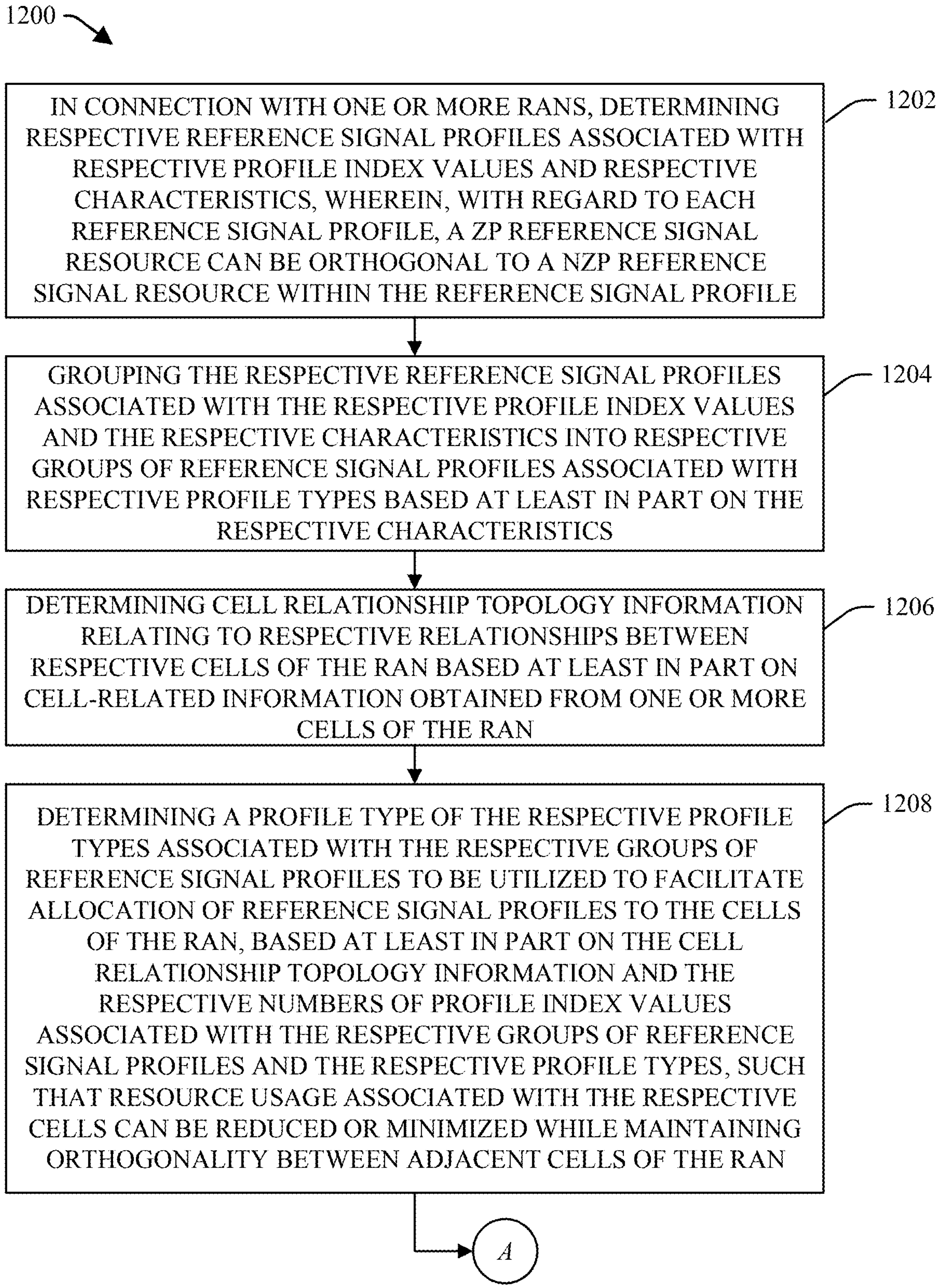
FIGS. 12 and 13 depict a flow chart of another example method that can desirably allocate and/or configure resources, including reference signal resources, on cells of a RAN of a communication network, in accordance with various aspects and embodiments of the disclosed subject matter.
Figure 13:
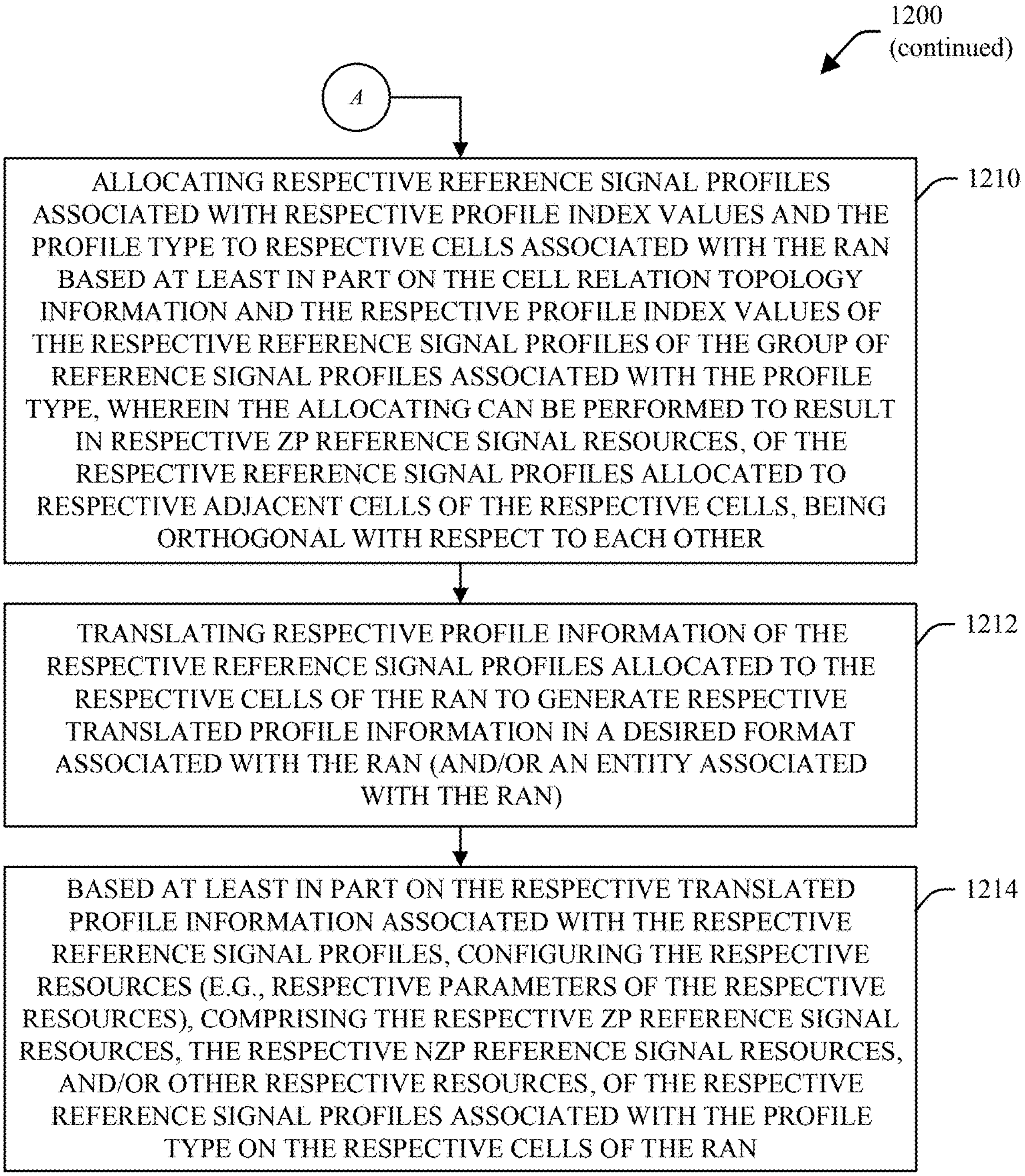

In view of the example systems and/or devices described herein, example methods that can be implemented in accordance with the disclosed subject matter can be further appreciated with reference to flowcharts in FIGS. 11-13. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 11 illustrates a flow chart of an example method 1100 that can desirably (e.g., automatically, dynamically, suitably, reliably, efficiently, enhancedly, and/or optimally) allocate and/or configure resources, including reference signal resources (e.g., CSI-RS resources), on cells of a RAN of a communication network, in accordance with various aspects and embodiments of the disclosed subject matter. The method 1100 can be employed by, for example, a system comprising the resource management component, which can comprise or be associated with the allocator component, the configuration component, the processor component, the data store, and/or other components.

At 1102, respective reference signal profiles associated with respective profile index values can be allocated to respective cells associated with a RAN based at least in part on the respective profile index values associated with a profile type that can be determined, from a group of profile types, based at least in part on cell relation topology information, wherein the allocating can be performed to result in respective ZP reference signal resources, of the respective reference signal profiles allocated to respective adjacent cells of the respective cells, being orthogonal with respect to each other. The allocator component can allocate (e.g., automatically allocate) the respective reference signal profiles (e.g., CSI-RS profiles) associated with the respective profile index values (e.g., CSI-RS profile index values) that are associated with the profile type (e.g., CSI-RS profile type) to the respective cells associated with the RAN. The resource management component can determine the profile type to be utilized for the allocation, from the group of profile types, based at least in part on the cell relation topology information and the respective profile index values (and associated respective reference signal profiles) associated with the respective profile types of the group of profile types, such as described herein. The allocator component can perform such allocation to have respective ZP reference signal resources, of the respective reference signal profiles allocated to the respective adjacent cells, be orthogonal with respect to each other, such as described herein. With regard to each reference signal profile associated with each profile index value and associated with each cell, the allocator component can allocate the respective resources to have or ensure that the respective ZP reference signal resources and the respective NZP reference signal resources of the reference signal profile be orthogonal with respect to each other, such as described herein.

At 1104, based at least in part on the respective reference signal profiles, respective parameters of respective resources, comprising the respective ZP reference signal resources, of the respective reference signal profiles can be set on the respective cells. For instance, the configuration component can set (e.g., configure) the respective parameters of the respective resources, comprising the respective ZP reference signal resources, respective NZP reference signal resources, and/or other resources, of the respective reference signal profiles on the respective cells.

FIGS. 12 and 13 depict a flow chart of another example method 1200 that can desirably (e.g., automatically, dynamically, suitably, reliably, efficiently, enhancedly, and/or optimally) allocate and/or configure resources, including reference signal resources (e.g., CSI-RS resources), on cells of a RAN of a communication network, in accordance with various aspects and embodiments of the disclosed subject matter. The method 1200 can be employed by, for example, a system comprising the resource management component, which can comprise or be associated with the allocator component, the configuration component, the processor component, the data store, and/or other components.

At 1202, in connection with one or more RANs, respective reference signal profiles (e.g., CSI-RS profiles) associated with respective profile index values (e.g., CSI-RS profile index values) and respective characteristics can be determined, wherein, with regard to each reference signal profile, a ZP reference signal resource can be orthogonal to a NZP reference signal resource within the reference signal profile. The resource management component (e.g., of or associated with the SMO) and/or a user associated with (e.g., utilizing or interacting with) the resource management component can determine and/or construct (e.g., build) the respective reference signal profiles associated with the respective profile index values and the respective characteristics such that, within the respective reference signal profiles, respective ZP reference signal resources can be orthogonal to respective NZP reference signal resources. For instance, with regard to each reference signal profile associated with each profile index value and associated with each cell, the resource management component and/or the user can determine or structure each reference signal profile such that the ZP reference signal resource and the NZP reference signal resource associated with the reference signal profile can be orthogonal with respect to each other (e.g., with regard to the one or more respective ZP reference signal resources and the one or more respective NZP reference signal resources associated with the reference signal profile), such as described herein. The respective reference signal profiles can comprise respective profile information (e.g., parameters, such as RAN-specific parameters, and/or other profile information) relating to respective resources (e.g., ZP reference signal resources, NZP reference signal resources, and/or other resources) that can be utilized by respective cells of the RAN.

At 1204, the respective reference signal profiles associated with the respective profile index values and the respective characteristics can be grouped into respective groups of reference signal profiles associated with respective profile types based at least in part on the respective characteristics. The resource management component and/or the user can analyze the respective characteristics (e.g., amount or level of resource usage, type of ZP reference signal, type of NZP reference signal, type of ZP reference signal (e.g., CSI-RS) or CSI-IM pattern, and/or another desired characteristic) associated with the respective reference signal profiles. Based at least in part on the results of such analysis, the resource management component and/or the user can determine which reference signal profiles have the same characteristics, and can group the respective reference signal profiles into the respective groups of reference signal profiles associated with the respective profile types such that each group of reference signal profiles associated with a profile type can comprise respective reference signal profiles that can comprise (e.g., have or share) the same respective characteristics.

For instance, based at least in part on the results of such analysis, the resource management component and/or the user can group a first portion of the respective reference signal profiles associated with first characteristics into a first group of reference signal profiles associated with a first profile type and the first characteristics, a second portion of the respective reference signal profiles associated with second characteristics into a second group of reference signal profiles associated with a second profile type and the second characteristics, a third portion of the respective reference signal profiles associated with third characteristics into a third group of reference signal profiles associated with a third profile type and the third characteristics, and/or another portion of the respective reference signal profiles associated with other characteristics into another group of reference signal profiles associated with another profile type and the other characteristics. There can be one or more profile types, depending on the respective characteristics of the respective reference signal profiles. In some embodiments, the resource management component and/or the user can index the respective reference signal files into the respective groups of reference signal profiles by the tuple {profile type, profile index value} or can index them in another desired manner.

At 1206, cell relationship topology information relating to respective relationships between respective cells of the RAN can be determined based at least in part on cell-related information obtained from one or more cells of the RAN. The resource management component and/or the user associated with the resource management component can determine the cell relationship topology information relating to the respective relationships (e.g., logical, physical, and/or locational relationships) between the respective cells of the RAN based at least in part on the results of analyzing the cell-related information obtained from the one or more cells of the RAN or another desired source, such as described herein. In some embodiments, the resource management component can utilize the ANR or another desired neighbor cell relationship determination or identification function or tool to obtain the cell-related information from the one or more cells of the RAN or the other desired source (e.g., data source) and, based at least in part on the results of analyzing the cell-related information, can determine the respective relationships between the respective cells of the RAN. In other embodiments, the resource management component can receive the cell relationship topology information from the user, or can determine the cell relationship topology information based at least in part on information received from the user.

At 1208, a profile type of the respective profile types associated with the respective groups of reference signal profiles to be utilized to facilitate allocation of reference signal profiles to the cells of the RAN can be determined, based at least in part on the cell relationship topology information and the respective numbers of profile index values associated with the respective groups of reference signal profiles and the respective profile types, such that resource usage associated with the respective cells can be reduced or minimized while maintaining orthogonality between adjacent cells of the RAN. The number of profile index values associated with a group of reference signal profiles can indicate a number of locations available for resource allocation (e.g., ZP reference signal resource allocation, NZP reference signal resource allocation, or other resource allocation), indicate or relate to an amount or level of resource usage, and/or a number of cells adjacent to a cell that can be accommodated while maintaining orthogonality between the adjacent cells, such as described herein. Typically, the higher the number of profile index values associated with a group of reference signal profiles and a profile type, the higher the amount or level of resource usage is and the higher the number of cells adjacent to a cell that can be accommodated while maintaining orthogonality between the adjacent cells.

The resource management component can determine and/or select the desired profile type, from the respective profile types, based at least in part on the results of analyzing the cell relationship topology information relating to the respective relationships between the respective cells of the RAN and the respective numbers of profile index values associated with the respective groups of reference signal profiles and the respective profile types, such that resource usage associated with the respective cells can be desirably reduced or minimized and orthogonality between adjacent cells of the RAN can be desirably maintained. For instance, if, based at least in part on the results of analyzing the cell relationship topology information (e.g., based at least in part on the respective relationships between the respective cells), the resource management component determines that orthogonality of the respective ZP reference signal resources across respective adjacent cells of the RAN can be maintained utilizing a lower resource profile type (e.g., utilizing only the lower resource profile type) associated with lower level resource usage and a lower number of profile index values, the resource management component can determine and/or select the lower resource profile type, such as described herein. If, instead, based at least in part on the results of analyzing the cell relationship topology information, the resource management component determines that orthogonality of the respective ZP reference signal resources across respective adjacent cells of the RAN cannot be maintained utilizing only the lower resource profile type, the resource management component can determine and/or select a higher (e.g., a next higher) resource profile type associated with a higher (e.g., a next higher) level resource usage and a higher number of profile index values, such as described herein.

As an example, in some embodiments, the lower resource profile type can comprise three different profile index values associated with three different reference signal profiles, and the higher resource profile type can comprise six different profile index values associated with six different reference signal profiles. If, based at least in part on the results of analyzing the cell relationship topology information, the resource management component determines that there is no cell of the RAN that has more than two adjacent cells (e.g., there are no more than two cells adjacent to, neighboring, or overlapping the cell, with regard to each cell), the resource management component can determine that the three profile index values associated with the lower resource profile type can be sufficient to perform desirable allocation of reference signal profiles to the cells to ensure orthogonality of the respective ZP reference signal resources associated with the respective reference signal profiles across respective adjacent cells of the RAN can be maintained while utilizing the lower resource profile type that can facilitate reducing or minimizing resource usage. Accordingly, the resource management component can select (e.g., automatically select) the lower resource profile type.

If, instead, based at least in part on the results of analyzing the cell relationship topology information, the resource management component determines that there is at least one cell of the RAN that has more than two adjacent cells, the resource management component can determine that the three profile index values associated with the lower resource profile type may not be sufficient to ensure that orthogonality of the respective ZP reference signal resources associated with the respective reference signal profiles across respective adjacent cells of the RAN can be maintained, since there is at least one cell that has more than two adjacent cells. That is, with regard to that group (e.g., set) of adjacent cells (e.g., a total of at least four adjacent cells), there can be at least two cells adjacent to each other than would end up having the same profile index value associated with the same reference signal profile, and, as a result, orthogonality of the respective ZP reference signal resources associated with the respective reference signal profiles across those adjacent cells cannot be maintained or ensured. As a result, the resource management component can determine (e.g., automatically determine) that the higher resource profile type can be selected and utilized for allocation of respective profile index values and associated respective reference signal profiles associated with the higher resource profile type to the respective cells of the RAN, with different profile index values (and different reference signal profiles) being allocated to respective adjacent cells, to ensure the desired orthogonality of the respective ZP reference signal resources associated with the respective reference signal profiles across those adjacent cells. The disclosed subject matter, by employing the resource management component and the techniques described herein, can thereby reduce or minimize resource usage (e.g., by using the lower or lowest resource profile type when doing so can be desirable or suitable), while still ensuring orthogonality between adjacent cells of the RAN.

In some embodiments, at this point, the method 1200 can proceed to reference point A, wherein, as depicted in FIG. 13, the method 1200 can proceed from reference point A to reference numeral 1210 and can proceed from that point, such as described herein.

At 1210, respective reference signal profiles associated with respective profile index values and the profile type can be allocated to respective cells associated with the RAN based at least in part on the cell relation topology information and the respective profile index values of the respective reference signal profiles of the group(s) of reference signal profiles associated with the profile type, wherein the allocating can be performed to result in respective ZP reference signal resources, of the respective reference signal profiles allocated to respective adjacent cells of the respective cells, being orthogonal with respect to each other. The allocator component can allocate (e.g., automatically allocate or assign) the respective reference signal profiles (e.g., CSI-RS profiles) associated with the respective profile index values (e.g., CSI-RS profile index values) and the profile type to the respective cells associated with the RAN based at least in part on the cell relation topology information and the respective profile index values of the respective reference signal profiles of the group(s) of reference signal profiles associated with the profile type. The allocator component can perform such allocation to have respective ZP reference signal resources, of the respective reference signal profiles allocated to the respective adjacent cells, be orthogonal with respect to each other, such as described herein. For instance, with regard to cells of the RAN that are adjacent to each other (e.g., cells that have coverage areas that are adjacent to or overlapping each other), the allocator component can allocate the respective reference signal profiles associated with respective (e.g., different) profile index values and the profile type to adjacent cells, which can result in orthogonality between the resources of the adjacent cells being maintained (e.g., which can result in orthogonality of a first ZP reference signal resource associated with a first cell and a second ZP reference signal resource associated with a second cell, associated with the first cell, being maintained).

At 1212, respective profile information of the respective reference signal profiles allocated to the respective cells of the RAN can be translated to generate respective translated profile information in a desired format associated with the RAN (and/or an entity associated with the RAN). The resource management component can employ the adapter component to translate or adapt the respective profile information (e.g., parameters and/or other profile information relating to the resources) of the respective reference signal profiles allocated to the respective cells of the RAN to generate the respective translated profile information in the desired format associated with the RAN (and/or the entity (e.g., vendor)). In some embodiments, the desired format can relate to a configuration model-specific syntax associated with (e.g., compatible with, usable by, or applicable to) the RAN (and/or the entity).

At 1214, based at least in part on the respective translated profile information associated with the respective reference signal profiles, the respective resources (e.g., respective parameters of the respective resources), comprising the respective ZP reference signal resources, the respective NZP reference signal resources, and/or other respective resources, of the respective reference signal profiles associated with the profile type can be configured on the respective cells of the RAN. For instance, the configuration component can configure (e.g., set) the respective parameters of the respective resources (e.g., the respective ZP reference signal resources, the respective NZP reference signal resources, and/or the other respective resources) of the respective reference signal profiles on the respective cells of the RAN based at least in part on the respective translated profile information associated with the respective reference signal profiles.

Figure 14:
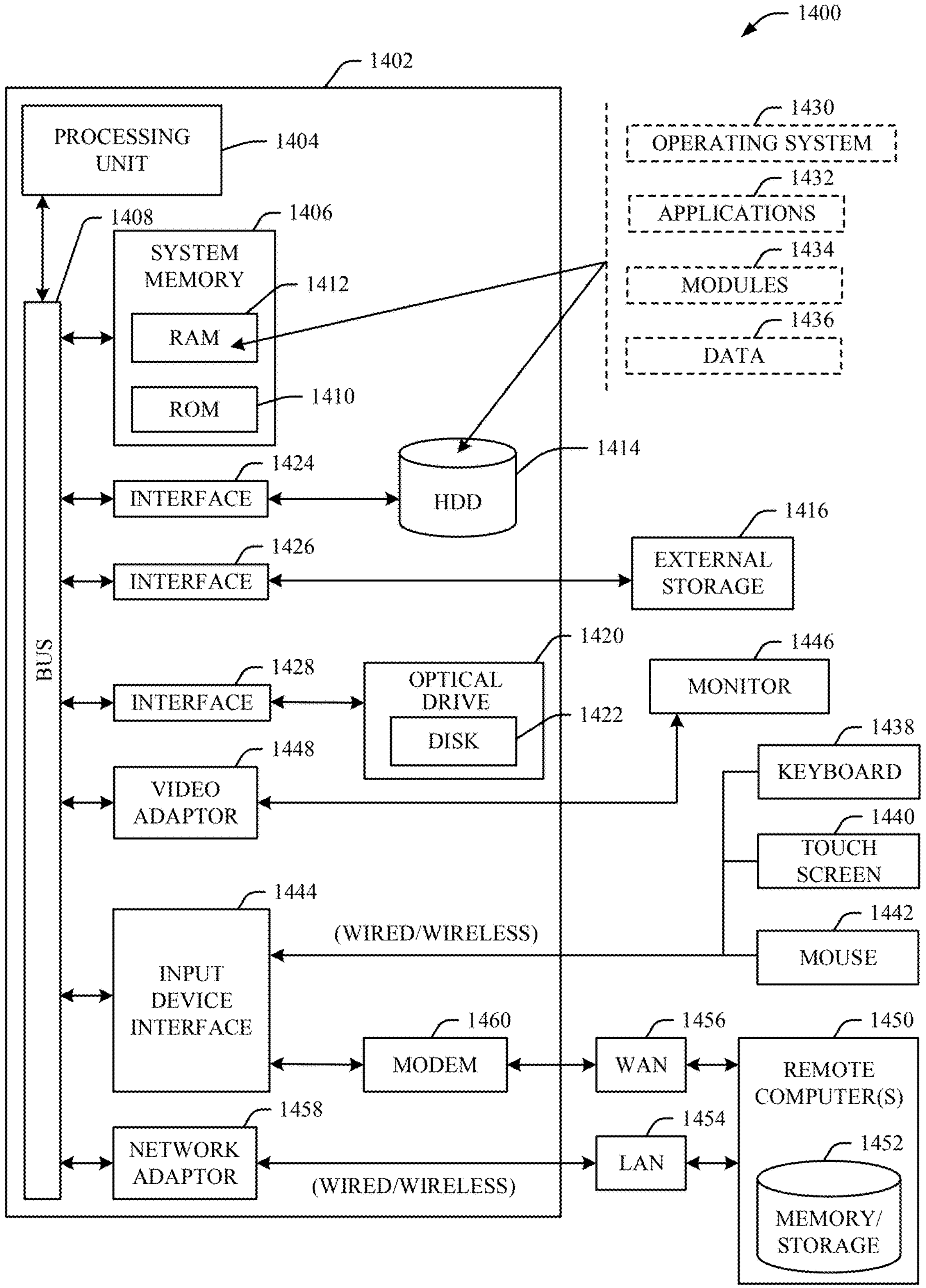
FIG. 14 illustrates an example block diagram of an example computing environment in which the various embodiments of the embodiments described herein can be implemented.

In order to provide additional context for various embodiments described herein, FIG. 14 and the following discussion are intended to provide a brief, general description of a suitable computing environment 1400 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456, e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "framework," "layer," "interface," "agent," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

A communication device, such as described herein, can be or can comprise, for example, a computer, a laptop computer, a server, a phone (e.g., a smart phone), an electronic pad or tablet, an electronic gaming device, electronic headwear or bodywear (e.g., electronic eyeglasses, smart watch, augmented reality (AR)/virtual reality (VR) headset, or other type of electronic headwear or bodywear), a set-top box, an Internet Protocol (IP) television (IPTV), IoT device (e.g., medical device, electronic speaker with voice controller, camera device, security device, tracking device, appliance, or other IoT device), or other desired type of communication device.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., device, UE, communication network, core network, RAN, base station, resource management component, allocator component, configurator component, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:

allocating, by a system comprising at least one processor, respective reference signal profiles associated with respective profile index values to respective cells associated with a radio access network based on the respective profile index values associated with a profile type, wherein the profile type is determined, from a group of profile types, based on cell relation topology information, wherein the allocating is performed to result in respective zero power reference signal resources, associated with the respective reference signal profiles allocated to respective adjacent cells of the respective cells, being orthogonal with respect to each other, wherein the respective cells comprise a first cell, a second cell, and one or more other cells other than the first cell and the second cell, wherein the respective adjacent cells comprise the first cell and the one or more other cells, wherein the first cell is adjacent to the one or more other cells, and wherein the second cell is not adjacent to the first cell; and based on the respective reference signal profiles, setting, by the system, respective parameters of respective resources, comprising the respective zero power reference signal resources, associated with the respective reference signal profiles on the respective cells.

2. The method of claim 1, wherein the respective reference signal profiles comprise a first reference signal profile and a second reference signal profile, wherein the respective zero power reference signal resources comprise a first zero power reference signal resource and a second zero power reference signal resource, wherein the first reference signal profile comprises first profile information relating to the first zero power reference signal resource and a first non-zero power reference signal resource that is orthogonal to the first zero power reference signal resource, wherein the second reference signal profile comprises second profile information relating to the second zero power reference signal resource and a second non-zero power reference signal resource that is orthogonal to the second zero power reference signal resource, and wherein the second zero power reference signal resource is orthogonal to the first zero power reference signal resource.

3. The method of claim 1, wherein the respective reference signal profiles are respective channel state information reference signal profiles comprising or relating to respective channel state information reference signal resources, wherein the respective zero power reference signal resources are respective zero power channel state information reference signal resources, and wherein the respective channel state information reference signal resources comprise the respective zero power channel state information reference signal resources and respective non-zero power channel state information reference signal resources.

4. The method of claim 1, further comprising:

performing, by the system, an artificial intelligence-based analysis on the cell relation topology information, cell-related information, resource-related information, reference signal profile-related information, or the group of profile types; and based at least in part on results of the artificial intelligence-based analysis, at least one of:

determining, by the system, the respective reference signal profiles comprising the respective resources;

grouping, by the system, the respective reference signal profiles into respective groups of reference signal profiles associated with respective profile types of the group of profile types;

determining, by the system, respective relationships between the respective cells;

determining, by the system, the profile type, from the group of profile types, to utilize for allocation of the respective reference signal profiles to the respective cells; or determining, by the system, allocation of the respective profile index values or the respective reference signal profiles to the respective cells.

5. The method of claim 1, further comprising:

with regard to the respective cells, detecting, by the system, the one or more other cells adjacent to the first cell; and based on the detecting, generating, by the system, the cell relation topology information, wherein the cell relation topology information indicates respective locational relationships between the respective cells, comprising indicating the one or more other cells adjacent to the first cell.

6. The method of claim 1, wherein the respective reference signal profiles are respective first reference signal profiles, wherein the profile type is a first profile type, and wherein the method further comprises:

determining, by the system, respective characteristics associated with the respective first reference signal profiles and respective second reference signal profiles based on an analysis of respective profile information of the respective first reference signal profiles and the respective second reference signal profiles, wherein the respective characteristics comprise or relate to the respective resources, the respective zero power reference signal resources, respective non-zero power reference signal resources, respective periodicities associated with the respective resources, respective zero power reference signal pattern types, or respective resource usage of the respective resources, and wherein the respective characteristics comprise a first group of characteristics and a second group of characteristics;

grouping, by the system, the respective first reference signal profiles into a first group of reference signal profiles associated with the first profile type of the group of profile types, based on the respective first reference signal profiles being determined to be associated with the first group of characteristics; and grouping, by the system, the respective second reference signal profiles into a second group of reference signal profiles associated with a second profile type of the group of profile types, based on the respective second reference signal profiles being determined to be associated with the second group of characteristics.

7. The method of claim 1, further comprising:

mapping, by the system, the respective parameters of the respective resources to the respective reference signal profiles based on the profile type and the respective profile index values, wherein the respective resources comprise the respective zero power reference signal resources and respective non-zero power reference signal resources.

8. The method of claim 1, further comprising:

translating, by the system, respective profile information of the respective reference signal profiles to respective translated profile information of the respective reference signal profiles based on a configuration model-specific syntax associated with the radio access network, wherein the setting comprises setting the respective parameters of the respective resources, comprising the respective zero power reference signal resources, associated with the respective reference signal profiles on the respective cells based on the translated profile information of the respective reference signal profiles.

9. The method of claim 1, wherein the group of profile types comprise a lower resource profile type and a higher resource profile type that has a higher amount of resource usage than the lower resource profile type, and wherein the method further comprises:

based on analyzing the cell relation topology information and the respective profile index values associated with the respective reference signal profiles associated with the lower resource profile type, determining, by the system, that the respective reference signal profiles are able to be allocated to the respective adjacent cells without any cell being associated with a same profile index value as another cell adjacent to the cell to ensure that the respective zero power reference signal resources, associated with the respective reference signal profiles allocated to the respective adjacent cells, are orthogonal with respect to each other; and selecting, by the system, the lower resource profile type to be the profile type utilized for the respective cells associated with the radio access network.

10. The method of claim 1, wherein the group of profile types comprise a lower resource profile type and a higher resource profile type that has a higher amount of resource usage than the lower resource profile type, wherein the respective reference signal profiles comprise respective first reference signal profiles associated with the lower resource profile type and respective second reference signal profiles associated with the higher resource profile type, wherein the respective profile index values comprise respective first profile index values associated with the respective first reference signal profiles and the lower resource profile type, and respective second profile index values associated with the respective second reference signal profiles and the higher resource profile type, and wherein the method further comprises:

based on analyzing the cell relation topology information and the respective profile index values associated with the respective reference signal profiles associated with the lower resource profile type:

determining, by the system, that the respective first reference signal profiles are not able to be allocated to the respective adjacent cells without any cell being associated with a same first profile index value of the respective first profile index values as another cell adjacent to the cell; and determining, by the system, that the respective second reference signal profiles are able to be allocated to the respective adjacent cells without any cell being associated with a same second profile index value of the respective second profile index values as the another cell adjacent to the cell to ensure that the respective zero power reference signal resources, associated with the respective reference signal profiles allocated to the respective adjacent cells, are orthogonal with respect to each other; and selecting, by the system, the higher resource profile type to be the profile type utilized for the respective cells associated with the radio access network.

11. The method of claim 1, wherein the respective cells are respective first cells, wherein a first group of cells comprises the respective first cells, wherein the respective reference signal profiles are first reference signal profiles, wherein the group of profile types is a first group of profile types, wherein the respective profile index values are respective first profile index values, wherein the cell relation topology information is first cell relation topology information, wherein the respective zero power reference signal resources are respective first zero power reference signal resources, wherein the respective adjacent cells are respective adjacent first cells, wherein the respective parameters are respective first parameters, wherein the respective resources are respective first resources, and wherein the method further comprises:

determining, by the system, that there is a modification of the first group of cells that results in a second group of cells comprising respective second cells, wherein the modification comprises a removal of at least one cell from, or an addition of at least one other cell to, the first group of cells that results in the second group of cells;

in response to the modification, determining, by the system, second cell relation topology information based on detection of respective relationships between the respective cells;

allocating, by the system, respective second reference signal profiles associated with respective second profile index values to the respective second cells based on a second profile type that is determined, from a second group of profile types, based on the second cell relation topology information, wherein the allocating is performed to result in respective second zero power reference signal resources, associated with the respective second reference signal profiles allocated to respective second adjacent cells of the respective second cells, being orthogonal with respect to each other, wherein the second group of profile types is same as or different from the first group of profile types, and wherein the second profile type is same as or different from the first profile type; and based on the respective second reference signal profiles, setting, by the system, respective second parameters of respective second resources, comprising the respective second zero power reference signal resources, associated with the respective second reference signal profiles on the respective second cells.

12. A system, comprising:

at least one memory that stores computer executable components; and at least one processor that executes computer executable components stored in the at least one memory, wherein the computer executable components comprise:

an allocator that allocates respective reference signal profiles associated with respective profile index values to respective cells associated with a network based on respective profile index values associated with a profile type, wherein the profile type is determined, from a group of profile types, based on cell relation topology data, wherein the allocator determines the respective reference signal profiles to allocate to respective adjacent cells of the respective cells to ensure that respective zero power reference signal resources, associated with the respective reference signal profiles allocated to the respective adjacent cells, are orthogonal with respect to each other, wherein the respective cells comprise a first cell, a second cell, and at least one other cell, wherein the respective adjacent cells comprise the first cell and the at least one other cell that is adjacent to the first cell, and wherein the second cell is not adjacent to the first cell; and a configurator that configures respective parameters of respective resources, comprising the respective zero power reference signal resources, associated with the respective reference signal profiles on the respective cells, based on respective reference signal profile data of the respective reference signal profiles.

13. The system of claim 12, wherein the respective reference signal profiles comprise a first reference signal profile and a second reference signal profile, wherein the respective zero power reference signal resources comprise a first zero power reference signal resource and a second zero power reference signal resource, wherein the respective reference signal profile data comprises first reference signal profile data associated with the first reference signal profile and second reference signal profile data associated with the second reference signal profile, wherein the first reference signal profile comprises the first reference signal profile data relating to the first zero power reference signal resource and a first non-zero power reference signal resource that is orthogonal to the first zero power reference signal resource, and wherein the second reference signal profile comprises the second reference signal profile data relating to the second zero power reference signal resource and a second non-zero power reference signal resource that is orthogonal to the second zero power reference signal resource.

14. The system of claim 12, wherein the respective reference signal profiles are respective channel state information reference signal profiles comprising or relating to respective channel state information reference signal resources, wherein the respective zero power reference signal resources are respective zero power channel state information reference signal resources, and wherein the respective channel state information reference signal resources comprise the respective zero power channel state information reference signal resources and respective non-zero power channel state information reference signal resources.

15. The system of claim 12, wherein the computer executable components comprise:

a detector that detects respective relationships between the respective cells, comprising detection of the respective adjacent cells being adjacent to each other; and a cell relation topology generator that, based on the detection of the respective relationships between the respective cells, generates the cell relation topology data, wherein the cell relation topology data indicates the respective relationships between the respective cells.

16. The system of claim 12, wherein the network comprises a radio access network, and wherein the computer executable components comprise:

an adapter that translates the respective reference signal profile data of the respective reference signal profiles to respective translated reference signal profile data of the respective reference signal profiles based on a configuration-related format associated with the radio access network, wherein the configurator configures the respective parameters of the respective resources, comprising the respective zero power reference signal resources, of the respective reference signal profiles on the respective cells, based on the translated reference signal profile data of the respective reference signal profiles.

17. The system of claim 12, wherein the respective reference signal profiles are respective first reference signal profiles, wherein the profile type is a first profile type, and wherein the computer executable components comprise:

a profile type grouper that determines respective attributes associated with the respective first reference signal profiles and respective second reference signal profiles based on an analysis of the respective reference signal profile data of the respective reference signal profiles, wherein the respective attributes comprise or relate to the respective resources, the respective zero power reference signal resources, respective non-zero power reference signal resources, respective periodicities associated with the respective resources, respective zero power reference signal pattern types, or respective resource usage of the respective resources, and wherein the respective attributes comprise a first group of attributes and a second group of attributes, wherein the profile type grouper groups the respective first reference signal profiles into a first group of reference signal profiles associated with the first profile type of the group of profile types, based on the respective first reference signal profiles being determined to be associated with the first group of attributes, and groups the respective second reference signal profiles into a second group of reference signal profiles associated with a second profile type of the group of profile types, based on the respective second reference signal profiles being determined to be associated with the second group of attributes.

18. The system of claim 12, wherein the computer executable components comprise:

a mapper that maps the respective parameters of the respective resources to the respective reference signal profiles based on the profile type and the respective profile index values, wherein the respective resources comprise the respective zero power reference signal resources and respective non-zero power reference signal resources.

19. A non-transitory machine-readable medium, comprising executable instructions that, when executed by at least one processor, facilitate performance of operations, comprising:

assigning respective reference signal profiles associated with respective profile index values to respective cells associated with a radio access network based on the respective profile index values associated with a profile type, wherein the profile type is determined, from a group of profile types, based on cell relation topology information that indicates respective locational relationships between respective cell coverage areas of the respective cells, wherein the assigning is performed to have respective zero power reference signal resources, associated with the respective reference signal profiles assigned to respective neighboring cells of the respective cells, be orthogonal with respect to each other, wherein the respective cells comprise a first cell, a second cell, and at least one other cell, wherein the respective neighboring cells comprise the first cell and the at least one other cell that neighbors the first cell, and wherein the second cell does not neighbor the first cell; and based on the respective reference signal profiles, configuring respective parameters of respective resources, comprising the respective zero power reference signal resources, associated with the respective reference signal profiles on the respective cells.

20. The non-transitory machine-readable medium of claim 19, wherein the respective reference signal profiles are respective channel state information reference signal profiles comprising or relating to respective channel state information reference signal resources, wherein the respective zero power reference signal resources are respective zero power channel state information reference signal resources, and wherein the respective channel state information reference signal resources comprise the respective zero power channel state information reference signal resources and respective non-zero power channel state information reference signal resources.

* * * * *